United States Patent
Abiko

(10) Patent No.: US 8,295,560 B2
(45) Date of Patent: Oct. 23, 2012

(54) BIOMETRIC INFORMATION OBTAINMENT APPARATUS, BIOMETRIC INFORMATION OBTAINMENT METHOD, COMPUTER-READABLE RECORDING MEDIUM ON OR IN WHICH BIOMETRIC INFORMATION OBTAINMENT PROGRAM IS RECORDED, AND BIOMETRIC AUTHENTICATION APPARATUS

(75) Inventor: Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 12/775,803

(22) Filed: May 7, 2010

(65) Prior Publication Data

US 2010/0266169 A1 Oct. 21, 2010

Related U.S. Application Data

(63) Continuation of application No. PCT/JP2007/071831, filed on Nov. 9, 2007.

(51) Int. Cl.
*G06K 9/00* (2006.01)

(52) U.S. Cl. .......... 382/124; 382/115; 382/125

(58) Field of Classification Search ........... 382/124–127
See application file for complete search history.

(56) References Cited

U.S. PATENT DOCUMENTS

| 5,832,102 | A | * | 11/1998 | Uchida | 382/124 |
| 6,091,839 | A | * | 7/2000 | Uchida | 382/125 |
| 6,289,114 | B1 | | 9/2001 | Mainguet | |
| 7,327,858 | B2 | * | 2/2008 | Weiss | 382/115 |
| 2001/0043728 | A1 | | 11/2001 | Kramer et al. | |
| 2004/0218790 | A1 | * | 11/2004 | Ping Lo | 382/124 |

FOREIGN PATENT DOCUMENTS

| JP | 9-134427 | A | 5/1997 |
| JP | 10-91769 | A | 4/1998 |
| JP | 2827994 | B2 | 11/1998 |
| JP | 11-253428 | A | 9/1999 |
| JP | 2003-67749 | A | 3/2003 |
| JP | 2003-208620 | A | 7/2003 |
| JP | 2003-337949 | A | 11/2003 |
| JP | 2006-72758 | A | 3/2006 |
| JP | 2007-202912 | A | 8/2007 |

OTHER PUBLICATIONS

International Search Report of PCT/JP2007/071831, mailing date of Dec. 11, 2007.

* cited by examiner

*Primary Examiner* — Vu Le
*Assistant Examiner* — Kenny Cese
(74) *Attorney, Agent, or Firm* — Fujitsu Patent Center

(57) ABSTRACT

A biometric information sensing apparatus, including a width detection device that detects a width of a biometric part in a biometric information image collected by a collection device that collects the biometric information image of the biometric part; a narrowing position detection device that detects a narrowing position of the biometric part in the biometric information image on the basis of the width; an orientation information obtainment device that obtains orientation information related to the biometric part in the biometric information image; and a determination device that determines a collection status of the biometric information image on the basis of the orientation information near the narrowing position.

18 Claims, 24 Drawing Sheets

BIOMETRIC INFORMATION OBTAINMENT APPARATUS, BIOMETRIC INFORMATION OBTAINMENT METHOD, COMPUTER-READABLE RECORDING MEDIUM ON OR IN WHICH BIOMETRIC INFORMATION OBTAINMENT PROGRAM IS RECORDED, AND BIOMETRIC AUTHENTICATION APPARATUS

CROSS-REFERENCE TO RELATED APPLICATION

This application is a continuation Application of a PCT international application No. PCT/JP2007/071831 filed on Nov. 9, 2007, in Japan, the entire contents of which are incorporated by reference.

FIELD

The embodiments discussed herein are related to a technique for obtaining biometric information, such as a fingerprint, a palm print, and, in particular, relates to a technique for determining a status of obtained biometric information.

BACKGROUND

With recent advancement of functionalities of compact information devices, such as cellular phones or PDAs (personal digital assistants), they are becoming capable of connecting to network or storing a larger amount of personal information, a great demand exist for enhancing the security performance of such devices. Conventional personal authentication techniques, such as those using passwords or ID (Identification) cards, can be adapted in order to ensure security at such devices.

However, since passwords or ID cards have a risk of being stolen, achieving a more reliable personal authentication technique (for authenticating that a user of a device is a true reregistered user) has been demanded.

For such a demand, a personal authentication by means of biometric information (biometrics) is highly reliable, thus meeting the above demand. This is especially convenient, when a fingerprint is used as biometric information.

When a personal authentication is performed using a fingerprint as biometric information, a fingerprint (i.e., a pattern constructing ridges that can contact a collection surface of a fingerprint sensor and valleys that cannot contact the surface) is collected as image information from a finger of an authenticated person using a capacitance type fingerprint sensor or an optical type fingerprint sensor.

Then, feature information (for example, position information of branch points or end points) is extracted from a foreground (for example, a ridge image) of the fingerprint image (hereinafter, also simply referred to as "fingerprint"), and the authenticated person is really who he is, is determined, i.e., a personal authentication is performed, by comparing the extracted feature information with registered feature information of the authenticated person that has been registered in advance.

A typical fingerprint sensor (hereinafter, sometimes referred to as a "flat surface type fingerprint sensor") that collects a fingerprint image from an authenticated person generally includes a sensor surface (collection surface) that is generally wider than the size of a finger.

However, in recent years, in order to incorporate fingerprint sensors into compact information devices, such as cellular phones or PDAs, the size of a sensor surface is made smaller than the size of a finger. Alternatively, an entire image of a fingerprint is obtained by using a sensor surface that is smaller and thinner than the size of a finger by combining a plurality of partial images that are sequentially collected.

Particularly, there are surface type fingerprint sensors or sweep type fingerprint sensors that are smaller than the size of a finger (see Patent References 1 and 2 listed below, for example).

A sweep type fingerprint sensors has a small rectangular collection surface (sensor surface/imaging surface) that is significantly shorter than a length of a finger. A plurality of partial images of a fingerprint of a finger is sequentially collected by the fingerprint sensor while the finger is being shifted with respect to the collection surface or the collection surface (fingerprint sensor) is being shifted with respect to the finger. The entire fingerprint image of the finger is regenerated from the plurality of partial images that are collected.

From the regenerated fingerprint image, information on feature points (branch points or endpoints of ridges) is extracted and generated, and a personal authentication is performed on the basis of the information. Note that such a relative shift of a finger with respect to the collection surface is referred to as a "sweep" or "slide."

Fingerprint sensing apparatuses having such sweep type fingerprint sensors are disclosed in Patent References 1 and 2 listed below, for example. In a sweep type fingerprint sensor, as described in Patent References 1 and 2 listed below, partial images of a fingerprint is sequentially captured by changing relative positions between the sensor and the finger. Both of the disclosures assume that partial images have overlapped portions when obtaining entire information of a fingerprint from the collected partial image of the fingerprint.

In addition, since a sweep type fingerprint sensor shifts a finger when capturing the fingerprint, a fingerprint that may not be obtained by conventional type fingerprint sensors against which a finger is pressed may be captured.

For example, generally, a fingerprint is collected at the distal end side from the distal joint (first joint). However, sweep type fingerprint sensors may capture a wider area, such as the distal joint or further proximal side (palm side), i.e., the area from the midpoint between the distal joint and the proximal joint to finger tip, or the area from the midpoint between the proximal joint and the middle finger joint to the finger tip, since sweep type fingerprint sensors can sequentially sense the finger while sliding the finger on the sensor. Especially, distal joints tend to be captured since they are adjacent to fingerprints.

There are techniques to extract such a finger tip area from a distal joint to the distal end side, i.e., an area of a fingerprint, and a technique to detect flexion creases in which the epidermis are concaved in grooves on the distal joint is disclosed in Patent References 3 to 5 listed below, for example.

Patent Reference 1: Japanese Laid-Open Patent Application No. H10-091769
Patent Reference 2: Japanese Laid-Open Patent Application No. 2003-208620
Patent Reference 3: Japanese Laid-Open Patent Application No. 2003-67749
Patent Reference 4: Japanese Laid-Open Patent Application No. 2006-72758
Patent Reference 5: Japanese Laid-Open Patent Application No. H09-134427

At a sweep type fingerprint sensor, as depicted in FIG. 23(a), a fingerprint is preferably collected while a user (authenticating person) sliding a finger from the starting position at which the area around the distal joint of the finger is pressed against a collection surface 100 of the sweep type sensor depicted in FIG. 23(a) toward the palm side (i.e., the right side in FIG. 23(a)) while contacting the finger on the collection surface (hereinafter, referred to as "sensor") 100.

The user may capture the fingerprint as depicted in FIG. 23(b) while bending his finger from the status depicted in FIG. 23(a). Note that FIG. 23(a) is a diagram illustrating the position of the finger when a slide starts, and FIG. 23(b) is a diagram illustrating a position of the finger when the slide ends.

However, when the fingerprint is captured by the sensor 100 while the finger is bent, an imperfect fingerprint image may be obtained in which the width of the fingerprint contacting the sensor 100 is narrowed around the center of the fingerprint, as in FIG. 24.

That is, as depicted in FIG. 23(b), when a fingerprint is captured while bending a joint of the finger, only a part of fingers indicated by the reference symbols 101 and 102 contact the sensor 100. As a result, as depicted in FIG. 24, a fingerprint image 104 of an imperfect collection status having narrowing part 103 may be collected.

Such a fingerprint in the imperfect collection status is a not good fingerprint suited for a fingerprint authentication since the fingerprint may have a limited number of feature points that match to those in a registered fingerprint, which may make the user authentication difficult.

In addition, both of surface type fingerprint sensors and sweep type fingerprint sensors may face the same difficulties. An example includes unclear differences between ridges and valleys. If the epidermis is cornified or a part of the epidermis is peeled off for some reasons, such as an injury, a fingerprint in an imperfect collection status image may be collected in which differences between ridges and valleys in the fingerprint becomes locally unclear.

In this case, the unclear part may not be captured when the sensitivity of the sensor is adjusted to the sensitivity of the entire fingerprint, or, the sensitivity of the entire fingerprint may become improper when the sensitivity of the sensor is adjusted to the unclear part. In addition, enhancement processing by means of software may enhance noises and may generate a pattern that is different from the biometric information, making correction of the imperfect status difficult.

Note that conventional techniques may determine that the contact width is narrow for a part at which sensing of the fingerprint is locally difficult. Thus, in a fingerprint image 104 in the imperfect collection status as depicted in FIG. 24 may be collected by surface type fingerprint sensor when the pressing force of a finger against a fingerprint sensing surface is weak, or when the surface of the finger is not clean or when skin is not in a good condition.

As a result, when a fingerprint image 104 as depicted in FIG. 24 is collected, it is preferred that a collection status of the fingerprint image 104 is determined that the narrowing part 103 in the fingerprint image 104 is not a joint and the fingerprint image 104 is imperfect.

The technique in the above Patent Reference 3 detects a joint position by performing a Sobel conversion on an input image followed by application of a Gauss conversion, and performing DP matching a power value calculated by concentration square sum and a standard power value having an ideal shape for each horizontal line in the image.

In addition, the technique in the above Patent Reference 4 divides a fingerprint image into predetermined areas, extracts orientations of ridges, and extracts the position of a joint by the directions and arrangements of the ridges. The technique in the above Patent Reference 5 determines a projection histogram by concentration projection processing on a fingerprint image in the X direction, calculates minimum points as valley candidates and the certainty factors of the valley candidates from the projection histogram, and extracts a joint from the candidates having the highest certainty factor.

However, conventional techniques disclosed in Patent References 3 to 5 cannot distinguish between a joint position and imperfect positions for an imperfect fingerprint image 104 as depicted in FIG. 24 in which the width of the fingerprint contacting the sensor is narrowed around the center of the fingerprint. Thus, the narrowing part 103 may be erroneously detected as a joint position, or the imperfect narrowing part 103 cannot be detected.

SUMMARY

Accordingly, it is an object in one aspect of the embodiments to provide a biometric information sensing apparatus including: a collection device that collects a biometric information image of a biometric part; a width detection device that detects a width of the biometric part in the biometric information image collected by the collection device; a narrowing position detection device that detects a narrowing position of the biometric part in the biometric information image on the basis of the width; an orientation information obtainment device that obtains orientation information related to the biometric part in the biometric information image; and a determination device that determines a collection status of the biometric information image on the basis of the orientation information near the narrowing position.

In addition, it is an object in one aspect of the embodiments to provide a biometric authentication apparatus includes, in the biometric information sensing apparatus, a biometric authentication device that performs biometric authentication using the biometric information image that is determined by the determination device as having a collection status of pass.

Furthermore, it is an object in one aspect of the embodiments to provide a biometric information sensing method, including: a collection step that collects a biometric information image of a biometric part; a width detection step that detects a width of the biometric part in the biometric information image collected at the collection step; a narrowing position detection step that detects a narrowing position of the biometric part in the biometric information image on the basis of the width; an orientation information obtainment step that obtains orientation information related to the biometric part in the biometric information image; and a determination step that determines a collection status of the biometric information image on the basis of the orientation information near the narrowing position.

In addition, it is an object in one aspect of the embodiments to provide a computer-readable recording medium on or in which a biometric information sensing program that implements a function to determine a collection status of a biometric information image of a biometric part collected by a collection device that collects the biometric information image is recorded, the program makes the computer function as: a width detection device that detects a width of the biometric part in the biometric information image collected by the collection device; a narrowing position detection device that detects a narrowing position of the biometric part in the biometric information image on the basis of the width; an orientation information obtainment device that obtains orientation information related to the biometric part in the biometric information image; and a determination device that determines a collection status of the biometric information image on the basis of the orientation information near the narrowing position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
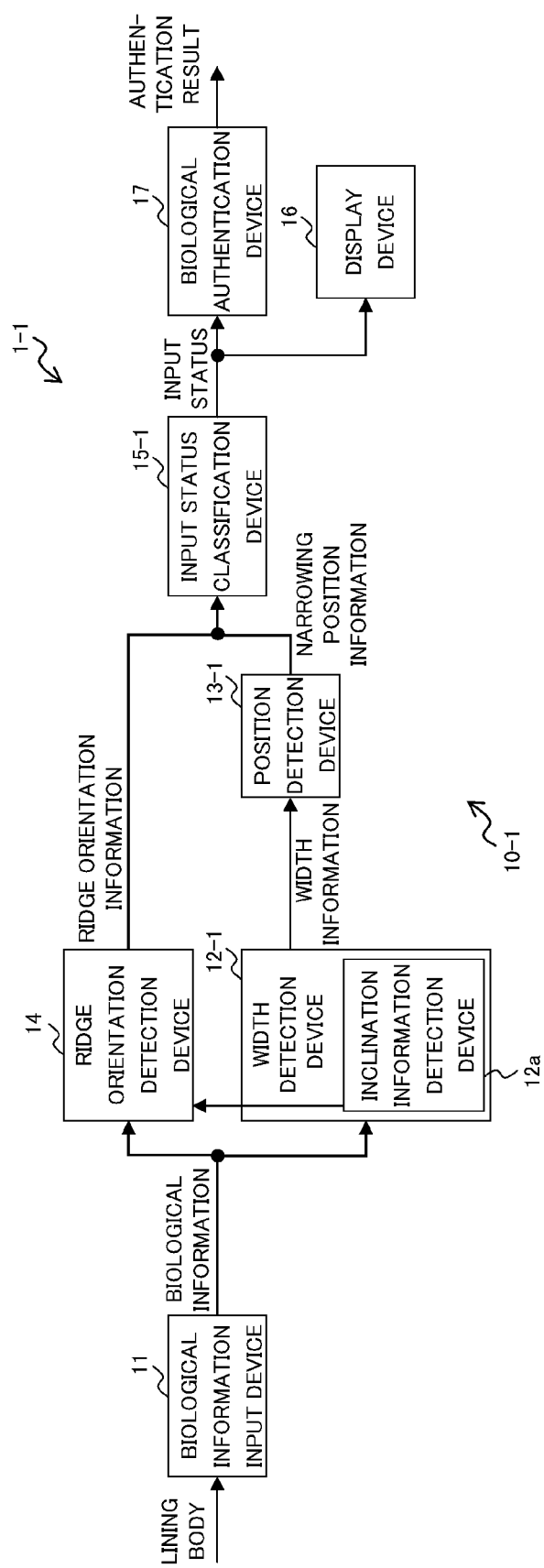
FIG. 1 is a block diagram illustrating the configuration of a biometric authentication apparatus as a first embodiment.

Hereinafter, embodiments will be described with reference to the drawings.

(1) Description of First Embodiment (1-1) Summary of Biometric Authentication Apparatus as First Embodiment First, the configuration of a biometric authentication apparatus 1-1 (hereinafter, referred to as a "biometric authentication apparatus) as a first embodiment will be described with reference to the block diagram depicted in FIG. 1.

The biometric authentication apparatus 1-1 is configured to include a biometric information input device (collection device) 11, a width detection device 12-1, a position detection device (narrowing position detection device) 13-1, a ridge orientation detection device (orientation information obtainment device) 14, an input status classification device (determination device) 15-1, a display device (notification device) 16, and a biometric authentication device 17.

In the diagram, the biometric information input device 11, the width detection device 12-1, the position detection device 13-1, the ridge orientation detection device 14, the input status classification device 15-1, and the display device 16 function as a biometric information sensing apparatus 10-1 as the first embodiment.

The biometric information input device 11 is adapted to collect a biometric information image of a biometric part, and is a fingerprint sensor that collects a fingerprint image of a finger. A fingerprint sensor as the biometric information input device 11 may include a sweep type fingerprint sensor or a surface type fingerprint sensor, for example, both of which visualize the fingerprint of a finger that makes a contact to collection surface (not illustrated).

Note that the biometric information input device 11 may employ any technique, such as capacitance type, heat-sensitive type, field emission type, optical type sensors, for example, as a fingerprint detection method.

The fingerprint is formed on the skin of the finger of a subject, and is a pattern made of ridges that are capable of contacting on the sensor surface (collection surface) (contact parts), and valleys that cannot contact the sensor surface (non-contacting part/void parts). A fingerprint sensor as the biometric information input device 11 is adapted to collect a multivalued image that is greater than a binary value, as a partial image of the fingerprint, by utilizing the fact that a sensing sensitivity of a ridge part that contacts a sensor surface is different from that in a valley part that does not contact the sensor surface. For example, the brightness of a ridge part is varied depending on the distance from the sensor in a multivalued image obtained by a capacitance type or electric field type fingerprint sensor, and typically, a ridge part closer to the sensor is displayed with a lower brightness and a valley part farther to the sensor is displayed with a higher brightness.

Alternatively, a ridge part closer to the sensor may be displayed with a higher brightness and a ridge part relatively farther to the sensor may be displayed with a lower brightness in a multivalued image. In this case, values in each image in the multivalued image may be inverted.

Note that when a fingerprint sensor as the biometric information input device 11 is a sweep type fingerprint sensor, a user slides a finger in any direction, such as from the base side of the finger, more specifically, near the first joint to the finger tip side, from the right side to the left side of the finger while contacting the finger on the sensor surface of the fingerprint sensor when the fingerprint sensor captures the fingerprint. Note that the user needs not to shift a finger when a mechanism to shift the fingerprint sensor with respect to the finger is provided.

The width detection device 12-1 is adapted to detect the width a finger (i.e., biometric part) in a fingerprint image that is captured (collected) by the biometric information input device 11. For example, when assuming that the longitudinal direction of a finger in a fingerprint image as the Y direction (hereinafter, sometimes referred to as the "Y-axis direction"), the width detection device 12-1 is adapted to detect a contact area (contact width in the X direction) between finger and the sensor from the fingerprint image for each line in the X direction that is perpendicular to the Y direction, or each block obtained by dividing the Y direction of the fingerprint image into a plurality of X directions. The term "contact area as used herein refers to the width in the X direction of the contour of finger represented by the fingerprint in the fingerprint image.

Figure 2:
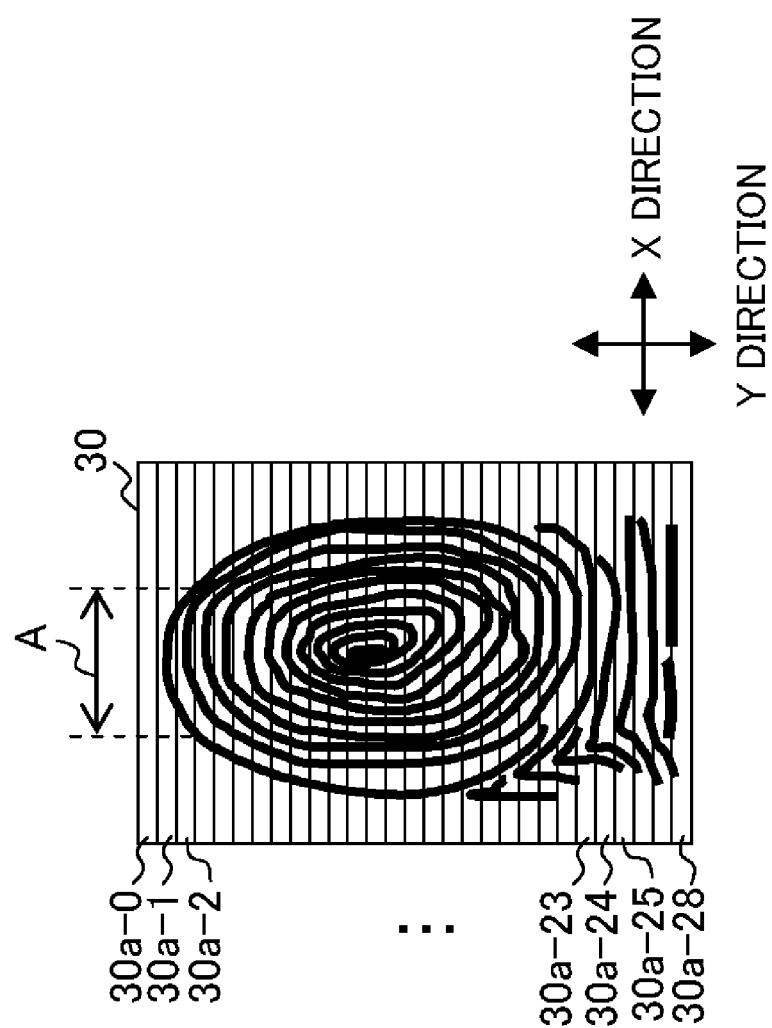
FIG. 2 is a diagram illustrating processing of a width detection device in the biometric authentication apparatus as the first embodiment.

More specifically, the width detection device 12-1 detects, as the width, the full width of the finger represented by the fingerprint for each of a plurality of divided images 30a-0 to 30a-28 (hereinafter, when no distinction between the divided image 30a-0 to 30a-28 is necessary, they are simply referred to using the reference symbol 30a) which is obtained by dividing a fingerprint image 30 in the X direction that is perpendicular to the longitudinal direction (Y direction in the drawing) of the finger, as depicted in FIG. 2, for example.

Note that a fingerprint image to be processed by the width detection device 12-1 may indicate ridge parts in white and valley parts in black, although the fingerprint image 30 in FIG. 2 is a simplified version of an actual fingerprint image and ridges are depicted by solid lines. In addition, in the fingerprint image 30 depicted in FIG. 2, the longitudinal direction of the fingerprint image 30 matches to the longitudinal direction of the finger in the fingerprint image 30. Furthermore, only reference symbols 30a-0 to 30a-2, 30a-23 to 30a-25, and 30a-28 are indicated in FIG. 2, among reference symbols of respective divided images 30a-0 to 30a-28, for the simplicity of illustration.

The width detection device 12-1 detects the longitudinal direction (Y direction) of the finger in the fingerprint image 30 collected and inputted by the biometric information input device 11, by means of an inclination information detection device 12a that will be described later with reference to FIG. 5 to FIG. 8 that will be described later, and divides the longitudinal direction (Y direction) of the fingerprint image 30 into equally distant parts in the X direction, as depicted in FIG. 2.

The width detection device 12-1 then detects the full width of the fingerprint (finger) in the X direction, as biometric information, in each divided image 30a. For example, the width A is detected for the divided image 30a-2.

Note that the method for detecting the width of the fingerprint in each divided image 30a by the width detection device 12-1 is not limited to the above-described method, and any other well-known techniques may be used.

In addition, the width detection device 12-1 includes the inclination information detection device 12a, as depicted in FIG. 1, and details of the inclination information detection device 12-1 and specific processing by the width detection device 12-1 will be described in detail with reference to FIG. 5 to FIG. 8, which will be described later.

The position detection device 13-1 is adapted to detect a narrowing position in the fingerprint image 30 on the basis of the width of the finger in the fingerprint image 30 detected by the width detection device 12-1 (i.e., the width of the fingerprint in each divided image 30a), and detects, as a narrowing position, the position of a divided image 30a that has a width smaller than the width of the adjacent divided image(s) 30a in the longitudinal direction of the finger in the fingerprint image 30.

For example, in FIG. 2, when the width of the divided image 30-24 detected by the width detection device 12-1 is smaller than the widths of the adjacent divided images 30-23 and 30-25, the position detection device 13-1 detects the position of the divided image 30-24 as a narrowing position.

Note that, when a plurality of divided images 30a having widths smaller than the widths of adjacent divided images 30a in the longitudinal direction are detected in the fingerprint image 30, the position detection device 13-1 detects, as a narrowing position, the position of the divided image 30a that has the smallest width, from the plurality of divided images 30a.

Note that more detailed processing for detecting a narrowing position by the position detection device 13-1 will be described with reference to FIG. 9 and FIGS. 10(a) and (b), which will be described later.

Figure 3:
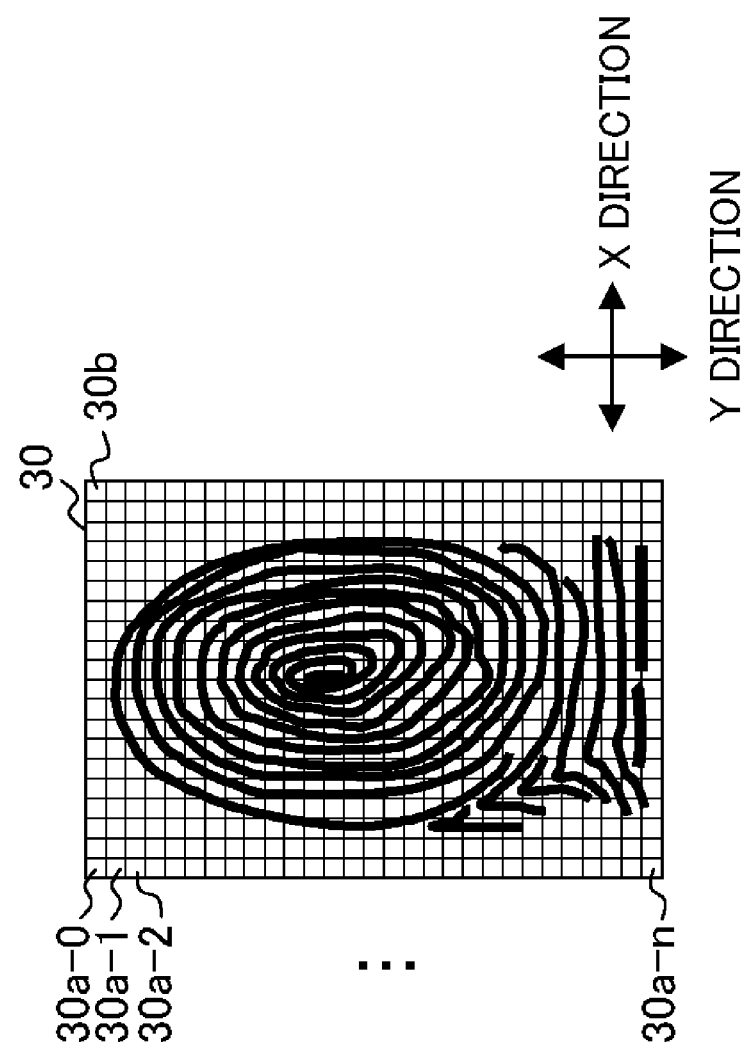
FIG. 3 is a diagram illustrating processing of a ridge orientation detection device in the biometric authentication apparatus as the first embodiment.

The ridge orientation detection device 14 is adapted to obtain, orientation information related to a biometric part, ridge orientations of the fingerprint in the fingerprint image 30 collected and inputted by the biometric information input device 11. For example, The ridge orientation detection device 14 is adapted to divide the fingerprint image 30 into small areas (cells) 30b having a predetermined size as depicted in FIG. 3, and detect the most dominant orientation of ridges for each small area 30b. Note that small areas 30b are obtained by further dividing each divided image 30a evenly in the X direction, in the example depicted in FIG. 3. In addition, the reference symbol 30b is indicated only for the upper right small area in the drawing for the simplicity of illustration in FIG. 3.

The input status classification device 15-1 is adapted to determine (classify) a collection status of the fingerprint image 30, on the basis of the narrowing position detected by the position detection device 13-1 (i.e., the position at which the narrowing occurs in the fingerprint image 30) and the orientation information (ridge orientation) detected by the ridge orientation detection device 14 near the narrowing position. Specifically, the input status classification device 15-1 determines whether the fingerprint image 30 is a pass status in which it can be used for a biometric authentication, or a fail status in which it cannot be used for a biometric authentication, and determines the type of the fail status, as a collection status on the basis of the position of the narrowing position in the fingerprint image 30 and the ridge orientation near the narrowing position, thereby classifying the fingerprint image 30.

More specifically, the input status classification device 15-1 is configured to determine, as a collection status, pass or fail of the fingerprint image 30 according to the length from narrowing position to the finger tip in the fingerprint image 30, and determines that the fingerprint image 30 is in a good collection status when the length is longer than a predetermined value, while determining that the fingerprint image 30 is in a failed collection status when the length is equal to or smaller than the predetermined value.

Furthermore, the input status classification device 15-1, when determining that the fingerprint image 30 is in a failed collection status, determines whether or not the narrowing position is a joint of the finger, on the basis of the distribution of the ridge orientations, as orientation information near the narrowing position, thereby determining the type of the fail status.

Specifically, the input status classification device 15-1 determines that the narrowing position is a joint of the finger, when the difference between the average of the ridge orientations detected by the ridge orientation detection section 14 in all small areas 30b constituting a divided image 30a detected as a narrowing position, and the direction perpendicular to the longitudinal direction of the finger in the fingerprint image (i.e., X direction) is equal to or smaller than a predetermined value, and a value indicating the variation related to the average (standard deviation or dispersion) is equal to or smaller than a predetermined value, and determines that the fingerprint image 30 is in a fail status in which a joint is inputted.

The fingerprint part (ridge orientations) at a joint of a human finger (distal joint or proximal joint) is concentrated to a direction that is perpendicular to the longitudinal direction of the finger. Thus, the input status classification device 15-1 determines that the narrowing position is a joint when the difference between the average of the ridge orientations at the narrowing position and the X direction is equal to or smaller than a predetermined value and the ridge orientations are close to the X direction, and when the standard deviation or the like of the average is equal to or smaller than a predetermined value, and the variation in the ridge orientations is smaller.

In contrast, the input status classification device 15-1 is adapted to determine that the narrowing position is caused by an imperfect input, and determines that the fingerprint image 30 is in a fail status due to an imperfect input when the difference between the average and the X direction is greater than the predetermined value (i.e., when the ridge orientations are not closed to the X direction), or when the standard deviation or the like of the average is greater than the predetermined value (i.e., when the variation in the ridge orientations is greater).

Figure 23:
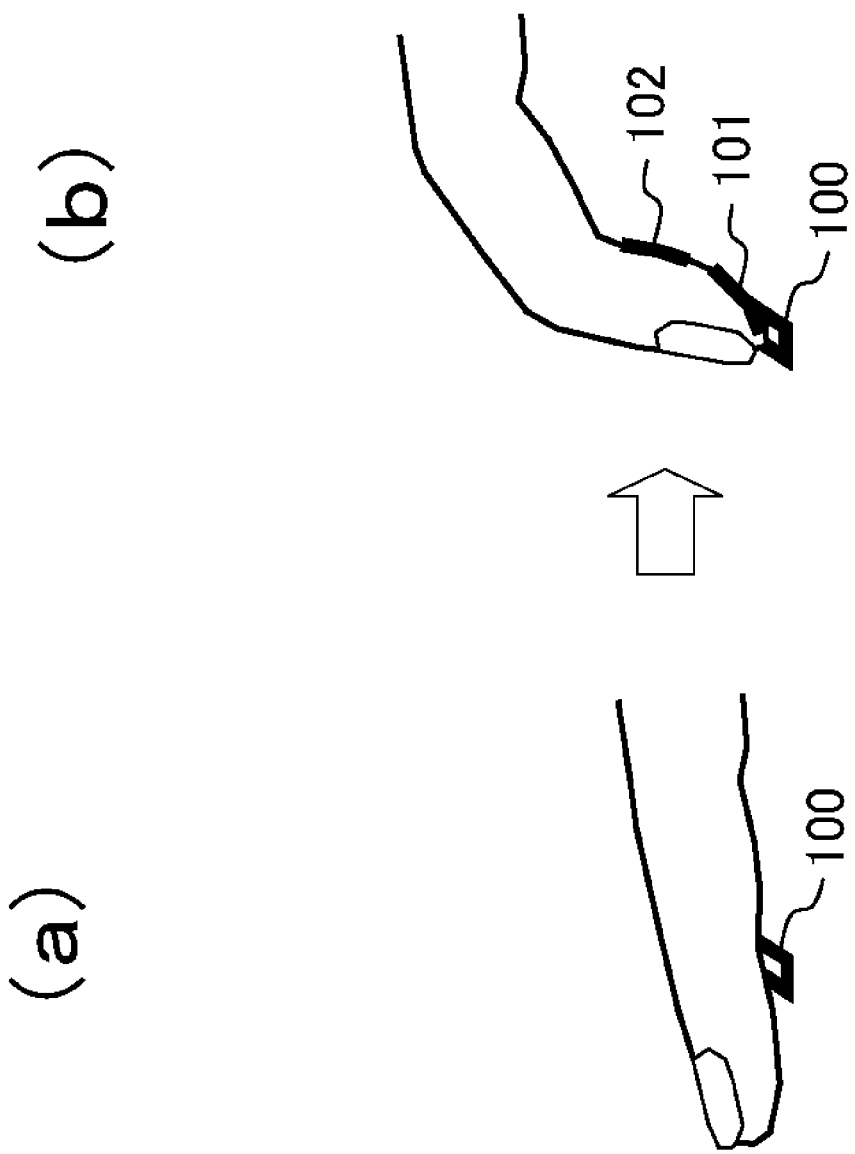
FIG. 23 is a diagram illustrating an imperfect input by a sweep type fingerprint sensor, wherein (a) is a diagram illustrating a position of a finger when a slide starts, and (b) is a diagram illustrating a position of the finger when the slide ends.
Figure 24:
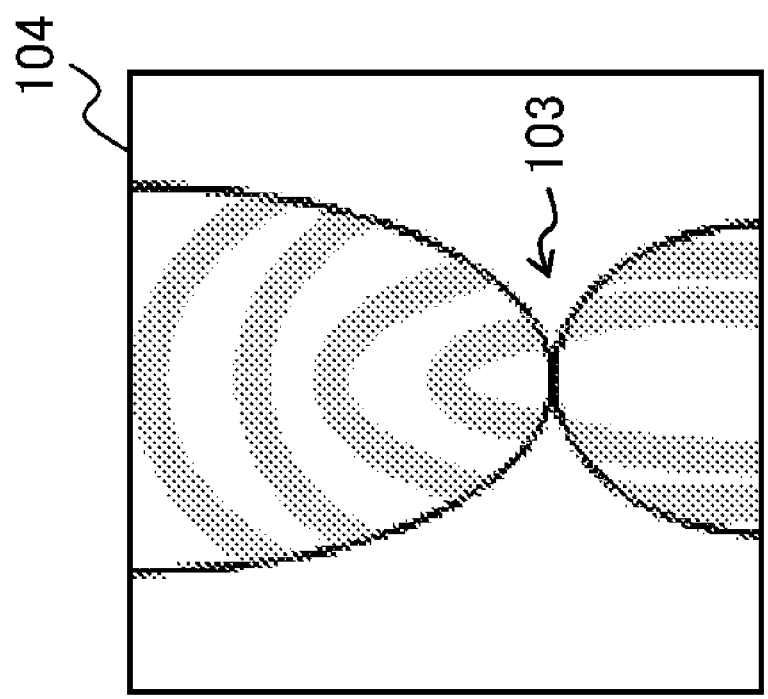
FIG. 24 is a diagram illustrating an example of a fingerprint image in an incomplete connection status.

The term "imperfect input" as used herein is caused by a bending of a finger, as illustrated in FIG. 23(b) and FIG. 24, which have been described previously, when the biometric information input device 11 is a sweep type fingerprint sensor, for example, or, caused by an unclean finger or insufficient pressing force of a finger against the collection surface when the biometric information input device 11 is a sweep type fingerprint sensor or a surface type fingerprint sensor.

Note that the determination processing by the input status classification device 15-1 will be described in detail with reference to FIG. 11 to FIG. 14, which will be described later.

The display device 16 is adapted to notify an outside (authenticating person) according to the collection status of the fingerprint image 30 determined (classified) by the input status classification device 15-1, that is a pass status, or, a fail status in which a joint is inputted, or a fail status due to an imperfect input.

Specifically, the display device 16 notifies the user who is trying to capture this or her fingerprint, by displaying a message according to the collection status on a display screen (not illustrated). For example, when the fingerprint image 30 is determined as a pass status by the input status classification device 15-1, the display device 16 displays a message of "Capture is completed" on the display screen.

In addition, when the fingerprint image is determined as a fail status by the input status classification device 15-1, the display device 16 displays a message of "Please capture again" on display screen, as well as displaying an additional message according to the type of the fail status.

For example, when a fail status in which a joint is inputted occurs and the biometric information input device 11 is a sweep type fingerprint sensor, the display device 16 displays a message of "Please capture the finger up to the finger tip" or "Try a different finger", in addition to the message of "Please capture again.".

Furthermore, when a fail status in which a joint is inputted occurs and the biometric information input device 11 is a surface type fingerprint sensor, the display device 16 displays a message of "Please press the finger stronger" or "Try a different finger", in addition to the message of "Please capture again.". Especially, before displaying "Try a different finger" upon matching, it is referred that the user has already registered a plurality of fingerprints in the biometric authentication apparatus 17.

In contrast, when a fail status due to an imperfect input occurs, the display device 16 displays a massage of "Please capture the finger up to the finger tip" or "Please capture the finger without bending it," in addition to the message of "Please capture again."

The biometric authentication device 17 is adapted to perform a biometric authentication using a fingerprint image 30, the collection status of which is determined as good by the input status classification device 15-1, and performs a biometric authentication by comparing the fingerprint image 30 with a registered fingerprint image that has been registered in a storage section (not illustrated) in the biometric authentication apparatus 1-1, for example.

Next, the operational procedure of the biometric authentication apparatus 1-1 (biometric information sensing apparatus 10-1) (that is, the biometric authentication method as the first embodiment of the present invention) will be described with reference to the flowchart (Step S1 to S6) depicted in FIG. 4. Note that Step S1 to S6, which will be described later, functions as a biometric information sensing method as the first embodiment.

Firstly, the biometric information input device 11 collects a fingerprint image as a biometric information image of a biometric part and inputs it into the biometric authentication apparatus 1-1 (Step S1; collection step).

Next, the width detection device 12-1 detects a width of the finger in the collected fingerprint image (Step S2; detection step). For this purpose, the width detection device 12-1 divides the fingerprint image into a plurality of divided images in the direction perpendicular to the longitudinal direction in order to divide the fingerprint image in the longitudinal direction of the finger (see FIG. 2). The width detection device 12-1 then detects a width for each of the plurality of divided images.

Subsequently, the position detection device 13-1 detects a narrowing position of finger in the fingerprint image on the basis of the plurality of widths related to the fingerprint images detected by the width detection device 12-1 (Step S3; narrowing position detection step). Specifically, the position detection device 13-1 detects, as a narrowing position, the position of the divided image that has a smaller width than both adjacent divided images in divided fingerprint images.

In the meantime, the ridge orientation detection section 14 obtains, as orientation information related to a biometric part, ridge orientations of the fingerprint in the fingerprint image collected by the biometric information input device 11 (Step S4; orientation information obtainment step). For this purpose, the ridge orientation detection section 14 divides the fingerprint image into a plurality of small areas (cells) corresponding to the divided images (see FIG. 3), and obtain the ridge orientation for each of the plurality of small areas.

Note that the order of processing of Step S2, and S3 and the processing of Step S4 is not particularly limited by the biometric authentication apparatus 1-1, and one of the processing is performed first or all processing may be performed simultaneously.

The input status classification device 15-1 determines a collection status of the fingerprint image (in this example, a pass status, a fail status in which a joint is inputted, or a fail status due to an imperfect input) on the basis of the narrowing position detected by the position detection device 13-1 and orientation information near the narrowing position detected by the ridge orientation detection device 14 (Step S5; determination step).

Subsequently, the display device 16 notifies the authenticating person according to the collection status determined by the input status classification device 15-1 (Step S6; notification step), and the processing is terminated.

Figure 4:
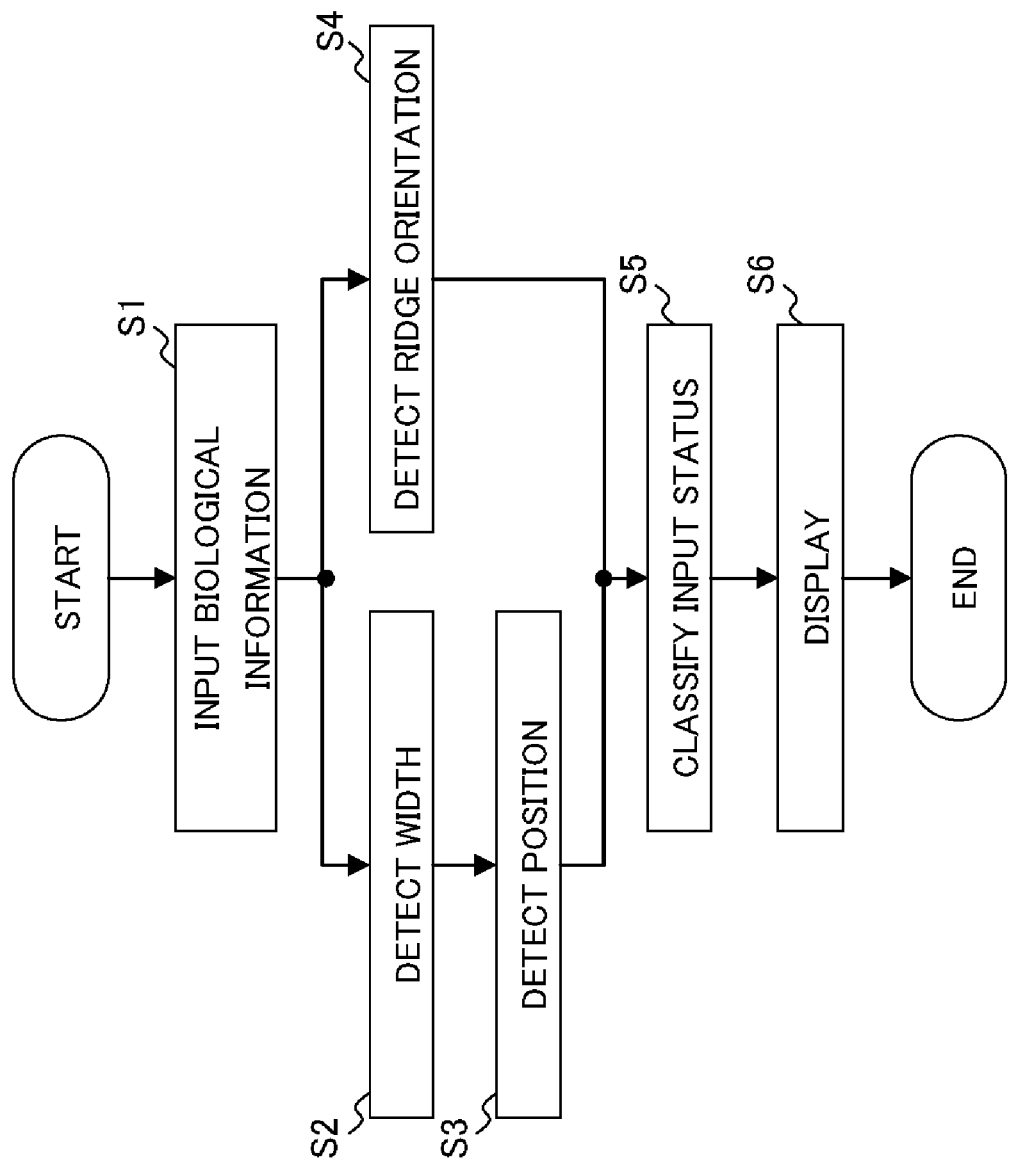
FIG. 4 is a flowchart illustrating one example of the operational procedure of the biometric information sensing method as the first embodiment.

Note that the biometric authentication device 17 performs a biometric authentication using the fingerprint image only when the input status classification device 15-1 determines that the collection status of the fingerprint image is in a pass status in the above Step S5 (biometric authentication step), although the step is not illustrated in the flowchart in FIG. 4.

As described above, in the biometric authentication apparatus 1-1, the biometric information sensing apparatus 10-1 is configured to collect a fingerprint image as a biometric information image and to determine a collection status of the collected fingerprint image. The display device 16 and the biometric authentication device 17 are configured to perform processing according to the collection status.

(1-2) Details of Width Detection Device 12-1, Position Detection Device 13-1, and Input Status Classification Device 15-1 on Biometric Authentication Apparatus 1-1 (Biometric Information Sensing Apparatus 10-1), as First Embodiment of the Present Invention (1-2-1) Details of Width Detection Device 12-1

Next, a more detailed configuration and details of the processing of the width detection device 12-1 will be described. The width detection device 12-1 is adapted to detect the width of the finger (fingerprint) in the fingerprint image, as described previously, and includes the inclination information detection device 12a, as depicted in FIG. 1.

The inclination information detection device 12a is adapted to detect the longitudinal direction of the finger (Y direction) in the fingerprint image as inclination information. Note that the longitudinal direction detected by the inclination information detection section 12a is also inputted to the ridge orientation detection section 14 or the input status classification device 15-1.

If the biometric information input device 11 is adapted to collect a fingerprint with a collection surface that has a width greater than the width of the finger, the biometric information input device 11 has a collection surface that has a width in the direction that is perpendicular to the longitudinal direction of the finger sufficiently wide such that the fingerprint image 30 that includes a full lateral width (width in the X direction) as depicted in FIG. 2 finger, the inclination information detection device 12a ellipse approximates a fingerprint (pattern) in the fingerprint image and detects the direction of the long axis of the ellipse as longitudinal direction (Y direction in FIG. 2).

Specifically, the inclination information detection section 12a expresses the direction of the long axis as an angle θ that is defined between the long axis of the ellipse that approximates the fingerprint image and the parallel direction of the fingerprint sensor (collection surface) in the biometric information input device 11, and can calculate the angle using the following Formula (1), where M represents moment feature about the centroid:

Eq. 1
$$\theta = \frac{1}{2}\tan^{-1}\left(\frac{2M_{11}}{M_{20} - M_{02}}\right) \quad (1)$$

where the moment feature M about the centroid ($M_{11}$, $M_{20}$, and $M_{02}$ in the above Formula (1)) is expressed by the following Formula (2):

Eq. 2
$$M_{pq} = \sum_i \sum_j (x - x_g)^p (y - y_g)^q f(x, y) \quad (2)$$

where f(x, y) represents the pattern of the fingerprint in the fingerprint image, and $x_g$ and $y_g$ represent the centroid coordinate of the pattern.

Figure 21:
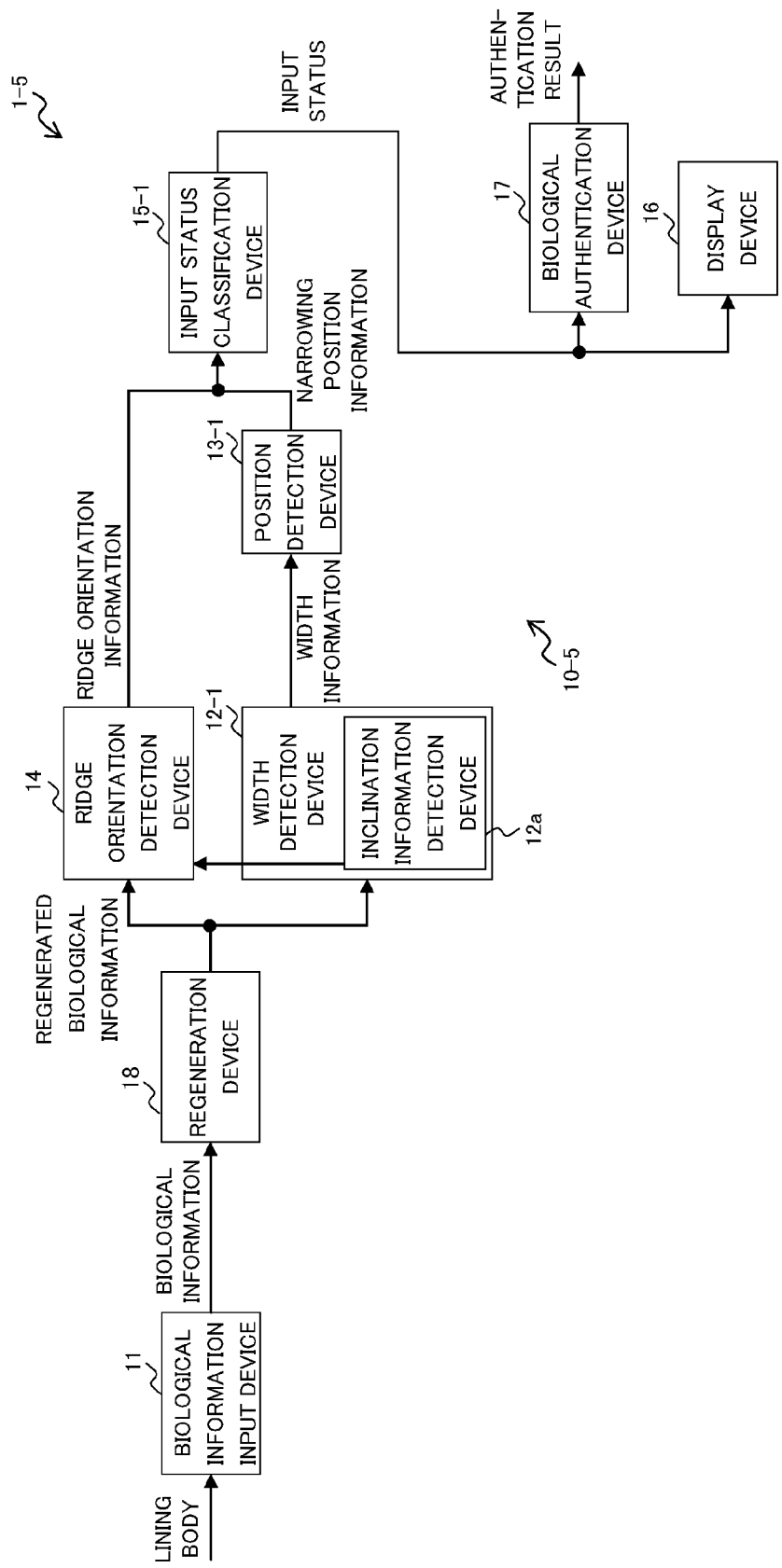
FIG. 21 is a block diagram illustrating the configuration of a biometric authentication apparatus as a variant of the embodiments.

In addition, when the brightness of the biometric information in an input image I(x, y) is higher than the brightness of the background information, it is assumed that the pattern f(x, y) in the above Formula (2) equals to the input image I(x, y), as indicated in the following Formula (3):

Eq. 3
$$f(x,y) = I(x,y) \quad (3)$$

where the input image I(x, y) represents the pattern of the fingerprint image inputted from the biometric information input device 11. Note that, as depicted in FIG. 21 which will be described later, when the fingerprint image (partial image) obtained by the biometric information input device 11 is regenerated by the regeneration device 18, which will be described later, the regenerated fingerprint image becomes the input image I(x, y).

In addition, the pattern f(x, y) may be expressed as the following Formula (4) using a predetermined threshold value $I_{th}$.

Eq. 4
$$f(x, y) = \begin{cases} I(x, y) & I(x, y) \geq I_{th} \\ 0 & \text{else} \end{cases} \quad (4)$$

In addition, where reducing the computation time for calculating the pattern f(x, y) is important, the pattern f(x, y) can be determined by the following Formula (5):

Eq. 5
$$f(x, y) = \begin{cases} 1 & I(x, y) \geq I_{th} \\ 0 & \text{else} \end{cases} \quad (5)$$

In contrast, when the brightness of the biometric information in the input image I(x, y) is lower than the brightness of the background information, the pattern f(x, y) can be represented by the following Formula (6), where $I_{max}$ is the maximum value of I.

Eq. 6
$$f(x,y) = I_{max} - I(x,y) \quad (6)$$

In addition, the pattern f(x, y) may be determined by the following Formula (7) using a predetermined threshold value $I_{th}$.

Eq. 7
$$f(x, y) = \begin{cases} I_{max} - I(x, y) & (I_{max} - I(x, y) \geq I_{th}) \\ 0 & \text{else} \end{cases} \quad (7)$$

Furthermore, when reduction in the computation time is important, the pattern f(x, y) may be determined by the following Formula (8):

Eq. 8
$$f(x, y) = \begin{cases} 1 & (I_{max} - I(x, y) \geq I_{th}) \\ 0 & \text{else} \end{cases} \quad (8)$$

Figure 5:
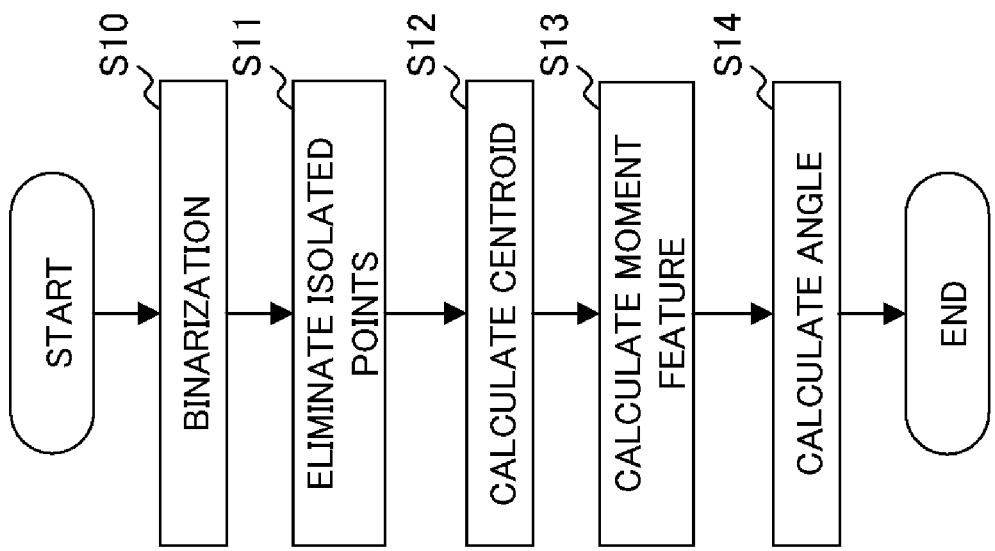
FIG. 5 is a flowchart illustrating the operational procedure of an inclination information detection device in the width detection device in the biometric authentication apparatus as the first embodiment.

In the following, with reference to the flowchart depicted in FIG. 5 (Steps S10 to S14), one example of processing procedure of the inclination information detection device 12a will be described. The inclination information detection device 12a firstly performs binary processing using the threshold value $I_{th}$ to determine the pattern f(x, y) (for example, processing using the above Formula (5), (8)) (Step S10).

Next, the inclination information detection device 12a performs isolated point elimination processing for determining the moment feature M about the centroid (Step S11), and further performs centroid calculation processing to determine the centroid ($x_g$, $y_g$) (Step S12).

The inclination information detection device 12a performs moment feature calculation processing for determining moment features ($M_{11}$, $M_{20}$, and $M_{02}$ in the above Formula (1)) with the above Formula (2) (Step S13), performs angle calculation processing for calculating the inclination θ as the longitudinal direction by substituting the obtained moment features ($M_{11}$, $M_{20}$, and $M_{02}$ in the above Formula (1)) into the above Formula (1) (Step S14), and terminates the processing.

When the biometric information input device 11 is a fingerprint sensor that has a collection surface having a width smaller than the width of the finger, it is difficult for the inclination information detection device 12a to precisely detect the longitudinal direction of the fingerprint pattern in the fingerprint image since the collected fingerprint image is not a full image of fingerprint.

Figure 6:
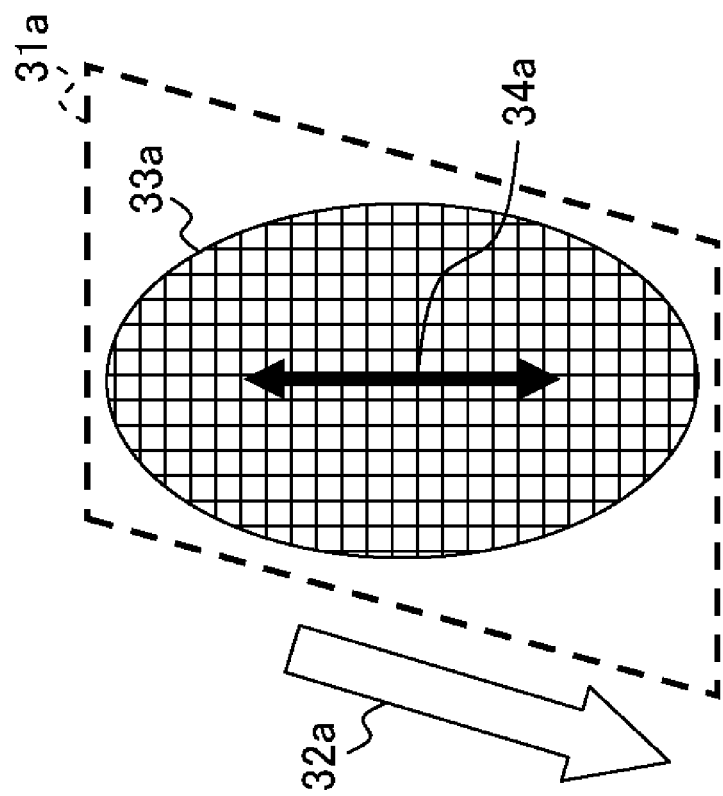
FIG. 6 is a diagram illustrating processing of an inclination information detection device in the biometric authentication apparatus as the first embodiment.

For example, as depicted in FIG. 6, when the biometric information input device 11 is a sweep type fingerprint sensor having a collection surface that has a width larger than the width of the finger, it is easier to determine the longitudinal direction 34a of the pattern 33a of the finger in fingerprint image 31a by generating a fingerprint image (taken area) 31a by combining the collected continuous fingerprint image, irrespective of the slide direction of the finger indicated by Arrow 32a. Note that the shaded areas indicated by the reference symbols 33a to 33c in FIG. 6 and FIG. 7 and FIG. 8, which will be described later, refer to the fingerprint pattern.

Figure 7:
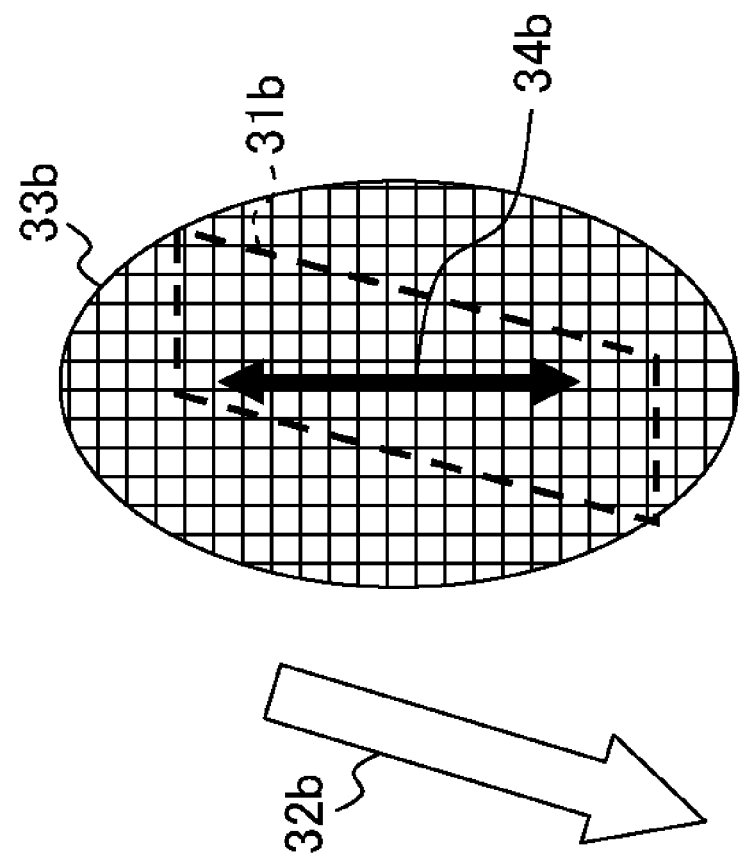
FIG. 7 is a diagram illustrating processing of the inclination information detection device in the biometric authentication apparatus as the first embodiment.
Figure 8:
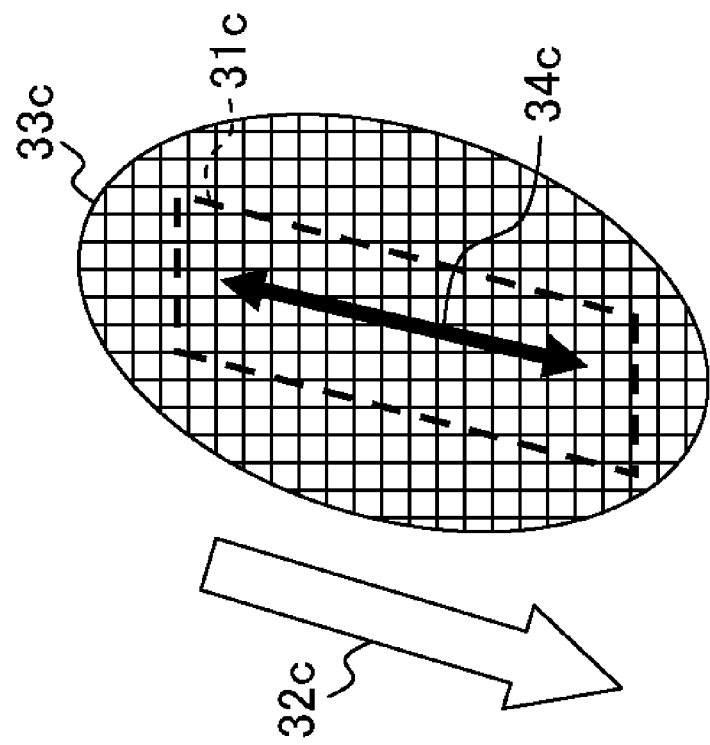
FIG. 8 is a diagram illustrating processing of the inclination information detection device in the biometric authentication apparatus as the first embodiment.

However, when the biometric information input device 11 is a fingerprint sensor having a collection surface that has a width smaller than the width of the finger (sweep type fingerprint sensor), it is difficult to determine whether or not the slide directions 32b and 32c of the finger correspond to the respective longitudinal directions 34b and 34c, since the captured areas 31b and 31c are part of the respective fingerprint patterns 33b and 33c, as depicted in FIG. 7 and FIG. 8.

That is, it is difficult for the inclination information detection device 12a to detect that the slide direction 32b and the longitudinal direction 34b of the pattern 33b do not match in the example depicted in FIG. 7, and that the slide direction 32c and the longitudinal direction 34c of the pattern 33c match in the example depicted in FIG. 8.

Accordingly, when the biometric information input device 11 is a sweep type fingerprint sensor that has a collection surface having a width smaller than the width of the finger, the inclination information detection device 12a assumes the slide direction of the finger with respect to the collection surface which is detected when combining each of continuous slice images collected by the biometric information input device 11, as the longitudinal direction of the finger.

It is preferred to minimize the difference between the longitudinal direction of the finger and the slide direction by taking some measures, such as providing a guide for a finger around the obtainment surface to a sweep type fingerprint sensor as the biometric information input device 11. This increases the precision of the longitudinal direction directed by the inclination information detection device 12a, thus, making determination of the input status of the fingerprint image by the input status classification device 15-1 more precise.

Note that, when it is assumed that a sweep type fingerprint sensor as the biometric information input device 11 starts sliding near a joint position, it is appropriate for the inclination information detection device 12a to assume the slide direction obtained from an initial slice image as the longitudinal direction.

In addition, the inclination information detection device 12a may calculate a plurality of initial slice images and determine the longitudinal direction on the basis of their statistics, considering the effect of the erroneous detection of the shift direction caused by noise or the like. Specifically, the statistics may be the average or the mode.

Furthermore, the coordinate axis that is used as a reference in the processing by the inclination information detection device 12a depends on the orientation in which a fingerprint sensor (biometric information input device 11) is mounted. When the longitudinal direction of the finger and the slide direction can be limited by providing a guide around the fingerprint sensor, the inclination information detection device 12a can assume the y axis defined by the orientation of mounting as the longitudinal direction of the finger (Y direction axis). Especially, in case of a sweep type fingerprint sensor, when processing is performed on a CPU (Central Processing Unit) having a relatively low performance, such as in case where the sensor is incorporated in a handheld terminal having a limited mounting space, the inclination information detection device 12a can reduce the amount of computation for determining the longitudinal direction by assuming the y axis defined by the orientation of mounting of the fingerprint sensor as the longitudinal direction of the finger (Y direction axis), which is practical.

As described previously, since the inclination information detection device 12a precisely detects the longitudinal direction of the finger in the fingerprint image as inclination information, the width detection device 12-1 generates a plurality of divided images by dividing the longitudinal direction (Y direction) in the fingerprint image detected by the inclination information detection device 12a into equally spaced parts in the X direction that is perpendicular to the Y direction, and detects a width of the fingerprint in the X direction in each of the divided images. Accordingly, the width detection device 12-1 can detect a width of the finger (fingerprint) in a fingerprint image more precisely.

(1-2-2) Details of Position Detection Device 13-1

Next, a more detailed configuration and details of the processing of the position detection device 13-1 will be described. The position detection device 13-1 detects, as described above, on the basis of the width of the finger in the fingerprint image detected by the width detection device 12-1, the position of the divided image that has a width smaller than the widths of both of the divided images that are adjacent in the longitudinal direction of the finger in the fingerprint image, as a narrowing position.

That is, the narrowing position detected by the position detection device 13-1 is the direction from which the width is increased in both directions on the Y-axis. Accordingly, any width detected by the width detection device 12-1 that is small but the width is monotonously decreased (or increased) only toward either one of Y-axis direction is not a narrowing position. For example, the position of a divided image of the finger tip which has a width of zero is not a narrowing position.

Figure 9:
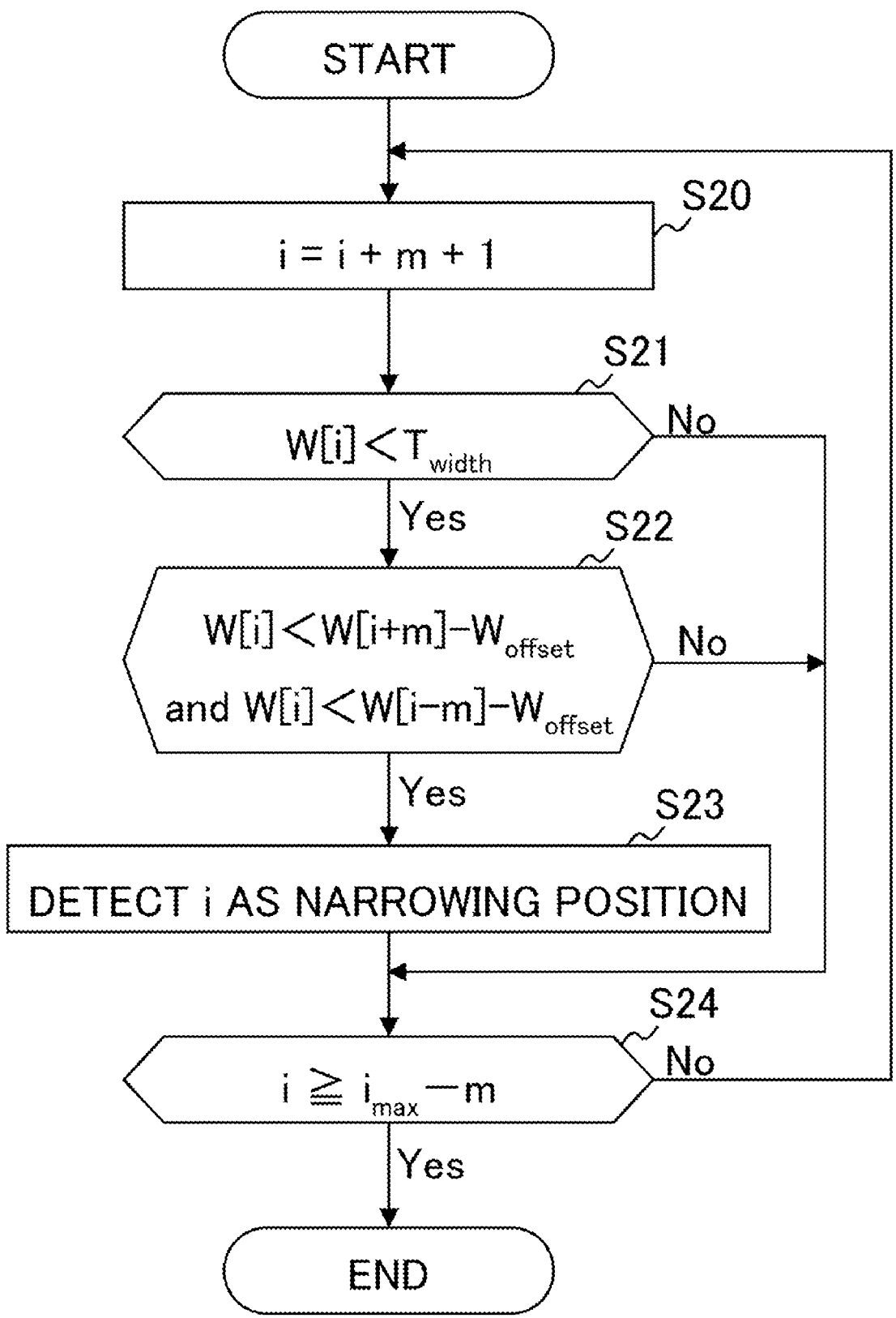
FIG. 9 is a flowchart illustrating one example of the operational procedure of a position detection device in the biometric authentication apparatus as the first embodiment.
Figure 10:
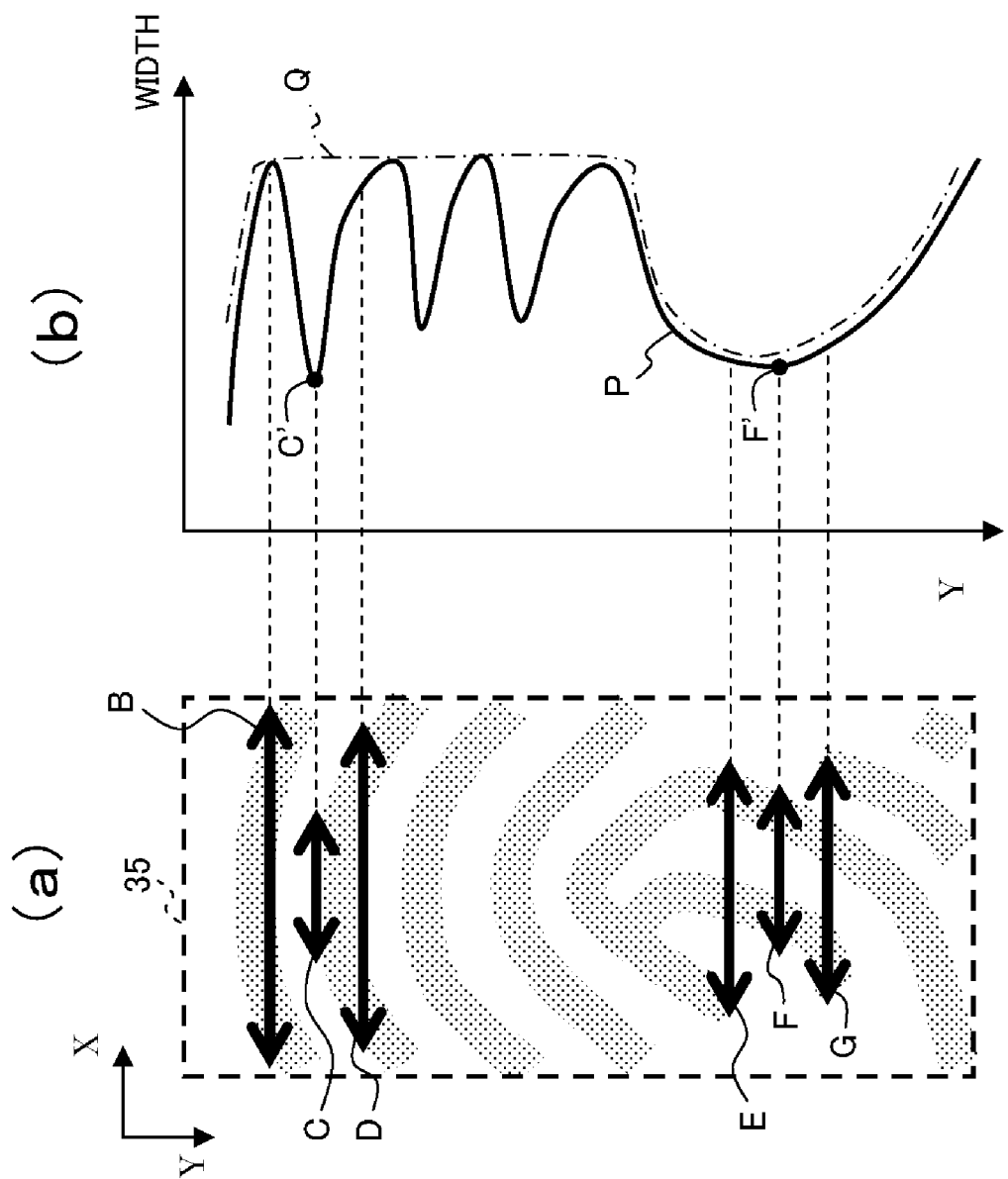
FIG. 10 is a diagram illustrating processing of the position detection device in the biometric authentication apparatus as the first embodiment.

Specifically, the position detection device 13-1 detects the narrowing position by performing the operational procedure indicated in the flowchart in FIG. 9 (Step S20 to S24) on divided images of the fingerprint image divided by the width detection device 12-1. Note that the description will be given with reference to an example in which the position detection device 13-1 performs processing on the fingerprint image 30 depicted in FIG. 2.

The position detection device 13-1 is configured to include a counter (not illustrated). The value of the counter i corresponds to the number 0 to 28 appended (the right end) in the reference numeral of the respective divided images 30a-0 to 30a-28 divided by the width detection device 12-1. The i-th contact width W[i] that will be described later represents the width of the divided image 30a that corresponds to the counter value i.

Firstly, the position detection device 13-1 increments the value i of the counter by "m+1" (Step S20), where "m" represents a predetermined offset amount for the counter value i.

The position detection device 13-1 then determines whether or not the width W[i] detected by the width detection device 12-1 in the i-th divided image of the incremented counter value is smaller than a predetermined threshold value $T_{width}$ (Step S21). The threshold value $T_{width}$ is the average of the widths of all divided images 30a, for example.

When the width W[i] is smaller than the threshold value $T_{width}$ (the Yes route in Step S21), the position detection device 13-1 determines whether or not the width W[i] is smaller than the widths of the two adjacent divided images 30a in the Y-axis direction (Step S22).

Specifically, the position detection device 13-1 determines whether or not both of the conditions defined in the following Formulae (9) and (10) are satisfied. In the following Formulae (9) and (10), $W_{offset}$ represents a predetermined offset amount for W (width).

$$W[i] < W[i+m] - W_{offset} \qquad (9)$$

$$W[i] < W[i-m] - W_{offset} \qquad (10)$$

When Formulae (9) and (10) are satisfied (the Yes route in Step S22), the position detection device 13-1 detects the position of the divided image 30a corresponding to the counter value i as a narrowing position, and registers the narrowing position to a storage section (not illustrated) (Step S23).

The position detection device 13-1 then determines whether or not the current counter value i is equal to or greater than the maximum value $i_{max}$ of the counter value i (the number (count) of widths detected by the width detection device 12-1 width, that is, the number of the divided image 30a; "29" in this example) subtracted by the offset amount m (Step S24). When the current counter value i is equal to or greater than the maximum value $i_{max}$ subtracted by the offset amount m (the Yes route in Step S24), the position detection device 13-1 terminates the processing.

In contrast, when the current counter value i is smaller than the maximum value $i_{max}$ subtracted by the offset amount m (the No route in Step S24), the position detection device 13-1 returns to the processing in the above-described Step S20.

The narrowing position detected by the position detection device 13-1 is the position of the divided image 30a having a width that is smaller than the widths of the divided images 30a adjacent in the Y-axis direction, and when there are a plurality of divided images 30a that are determined as a narrowing, the position of the divided image 30a that has the smallest width from them. Accordingly, when the width W[i] is equal to or greater than the threshold value $T_{width}$ in the above Step S21, it can be determined that the width W[i] is not a narrowing position. In other words, the average or the like is used as the threshold value $T_{width}$, for making such a determination.

Thus, when the width W[i] is equal to or greater than the threshold value $T_{width}$ in the above Step S21, the position detection device 13-1 determines that the width W[i] is not a narrowing position (the No route in Step S21), and moves to the processing in the above Step S24 without performing the processing in the above Steps S22 and S23.

In addition when at least one of the above Formulae (9) and (10) is not satisfied in the above Step S22, the position detection device 13-1 determines that the width W[i] is not a narrowing position (the No route in Step S21), and moves to the processing in the above Step S24 without performing the processing in the above Steps S22 and S23.

When there are a plurality of divided images 30a that can be considered as a narrowing, the position detection device 13-1 detects, as a narrowing position, the position of the divided image 30a that has the smallest width from them. Thus, the processing in the above Step S23 is configured to, when a storage section has a previously registered narrowing position, compare the width of the registered narrowing position and the width of a new narrowing position, and overwrite the old one with the new narrowing position only when the new narrowing position is smaller than the width of the previously registered narrowing position.

In addition, there may be a case in which a series of positions having narrower widths of the fingerprint in the fingerprint image 30. That is, when W[i] is similar to W[i+m], or W[i] is similar to W[i−m], the position detection device 13-1 may be configured to perform additional processing to sequentially increment the offset m during the processing depicted in FIG. 9. That is, when the processing in Step S22 determines that the width W[i], width W[i+m], and width W[i−m] are similar and the width W[i] is not determined as a narrowing, the position detection device 13-1 may be configured to change the offset m in Step S20. This helps to more efficiently detect a narrowing position and thereby reducing the processing time for detecting the narrowing position.

When W[i] becomes greater (wider) than W[i+m] or W[i−m], the processing for sequentially increment "m" is terminated. Note that the divided image 30a corresponding to the counter value i is not detected as a narrowing position in such a case.

The position detection device 13-1 is configured to detect a narrowing position after performing smoothing on data of the width detected by the width detection device 12-1 using a filter wider than the ridge distance for a plurality of widths of the plurality of divided images detected by the width detection device 12-1.

Although the position detection device 13-1 handles, for detecting the narrowing position, a plurality of widths sequentially detected by the width detection device 12-1 along the longitudinal direction of the finger (Y-axis direction) in the fingerprint image, for biometric information that are made up of ridges and valleys, such as a fingerprint or a palm print, smaller width may be detected in parts where no ridge contacts to a contour line of the contact area if the width detection device 12-1 detects widths more precisely, such as a quantization unit.

Especially in the case where widths of the collection surface (sensing surface) of the biometric information input device 11 is narrow, the width detected by the width detection device 12-1 becomes smaller in parts in which a ridge extends laterally, such as the finger tip side or the distal joint side in the fingerprint in the fingerprint image.

In a fingerprint image 35 in FIG. 10(a) which is collected by the biometric information input device 11, parts of widths detected by the width detection device 12-1 are indicated by Arrows B to G. For example, although Arrow C is actually not a narrowing, due to the position of the width detection y the width detection device 12-1 (how the fingerprint image 35 is divided), it is detected by the position detection device 13-1 as a narrowing position on the basis of its relationship with Arrows B and D.

Note that, in this case, the position of the actual narrowing position, Arrow F, is detected by the position detection device 13-1 as a narrowing on the basis of its relationship with Arrows E and G. However, since the width of Arrow C is smaller than the width of Arrow F (see Point C' and Point F' in FIG. 10(b)), the position detection device 13-1 detects the position of Arrow C (Point C' in FIG. 10(b)) as a narrowing position. Note that FIG. 10(b) is a drawing representing the data array of widths corresponding to FIG. 10(a), and the solid line P represents widths detected by the width detection device 12-1 and the long and short dashed line Q represents widths expected from the fingerprint image 35.

In addition, the width detection device 12-1 may detect a width inside a ridge in the fingerprint image affected by the blurring of the finger or the sweat glands.

The width that is detected as a narrowing at the position that is different from the actual narrowing position (Point C' in FIG. 10(b)) constitutes a noise during detection of a narrowing position by the position detection device 13-1.

Accordingly, for enabling the position detection device 13-1 to reliably detect Point F' that is the actual narrowing position as a narrowing position without erroneously detecting Point C' as a narrowing position in FIG. 10(b), a narrowing position is detected after performing smoothing on the data (data array) of widths detected by the width detection device 12-1 using a filter having a wider range than a ridge distance in the fingerprint image 35.

For this, stable widths need to be calculated without being affected by the minimum value of widths that constitutes a noise. That is, an envelope of the data array of a plurality of widths detected by the width detection device 12-1 needs to be detected, and the position detection device 13-1 performs smoothing on the data array of the widths using a window size of 2m+1 that is wider than the ridge distance using the following Formula (11). In the following Formula (11), Wi' represents the i-th element of the widths that are locally smoothed.

Eq. 9

$$W'_i = \frac{1}{2m+1} \sum_{k=(i-m)}^{i+m} Wk \quad (11)$$

Note that the window size 2m+1 is referable determined on the basis of a ridge distance in a fingerprint image to be processed. Note that ridge distance is detected by the width detection device 12-1 or the position detection device 13-1 on the basis of a fingerprint image. In addition, in the case where reduction of the computation time is required, the window size may be determined on the basis of a preset typical ridge distance.

A reduced value of Wi' smaller than the actual width due to smoothing near the minimum value that is not the narrowing position is unavoidable, and the difference from the narrowing position becomes smaller. As a result, a risk of ignoring the true position that must be detected is increased. To avoid this, when the contact width is close to the width of the imaging area, that is, the difference from the width of the sensing surface of the biometric information collection device is smaller than a predetermined threshold value, Wi' may be calculated by multiplying Wi' in the above Formula (11) by a coefficient of one or greater as a weight.

As described above, since the position detection device 13-1 detects a narrowing position after performing smoothing on the data of the widths detected by the detection device 12-1, as depicted in FIGS. 10(a) and (b), it is possible to precisely and reliably detect the position of the width of Arrow F as a narrowing position without erroneously detecting the position of the width of Arrow C as a narrowing position.

(1-2-3) Details of Input Status Classification Device 15-1

Next, a more detailed configuration and details of the processing of the input status classification device 15-1 will be described. As described previously, the input status classification device 15-1 is adapted to determine a collection status of a fingerprint image, on the basis of a narrowing position detected by the position detection device 13-1 and a ridge orientation in the narrowing position detected by the ridge orientation detection section 14. Specifically, it performs determination processing related to the operational procedure depicted in flowchart in FIG. 11 (Step S30 to S35).

Firstly, the input status classification device 15-1 calculates the length from narrowing position that is detected by the position detection device 13-1 to the finger tip, and determines whether or not the calculated length is equal to or greater than a redetermined value $T_{Length}$ (Step S30). Note that the predetermined value $T_{Length}$ is the minimum value of the length of a fingerprint required for authentication.

Figure 12:
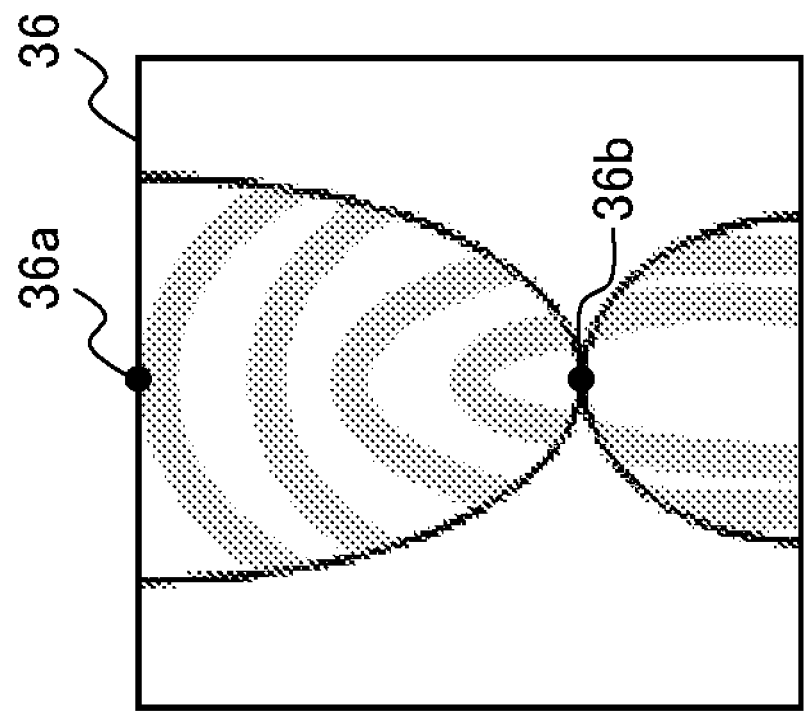
FIG. 12 is a diagram illustrating processing of the input status classification device in the biometric authentication apparatus as the first embodiment.

In addition, when a fingerprint image 30 includes a fingerprint of the finger tip as depicted in FIG. 2, for example, the input status classification device 15-1 calculates the length from the finger tip to the narrowing position. However, when the fingerprint image 36 includes no fingerprint of the finger tip as depicted in FIG. 12, the input status classification device 15-1 calculates the length from an end 36*a* on the finger tip side to the narrowing position 36*b* in fingerprint image 36, as a length from the finger tip to the narrowing position.

When the calculated length from the finger tip to the narrowing position is equal to or greater than the predetermined value $T_{Length}$ (the Yes route in Step S30), the input status classification device 15-1 determines the collection status of that fingerprint image as a pass status in which the image can be used for authentication (Step S31) and the processing is terminated.

That is, since a fingerprint has a complex pattern at the central portion of from the distal joint to the finger tip, such a fingerprint is suitable for personal authentication. Accordingly, the input status classification device 15-1 determines the collection status of that fingerprint image as better, on the basis of the predetermined value $T_{Length}$, as the distance from the finger tip to the narrowing position is increased so that such a central portion is increased.

In contrast, when the calculated length from the finger tip to the narrowing position is smaller than the predetermined value $T_{Length}$ (the No route in Step S30), the input status classification device 15-1 determines the collection status of that fingerprint image as a fail status in which the image cannot be used for authentication (Step S32).

Figure 13:
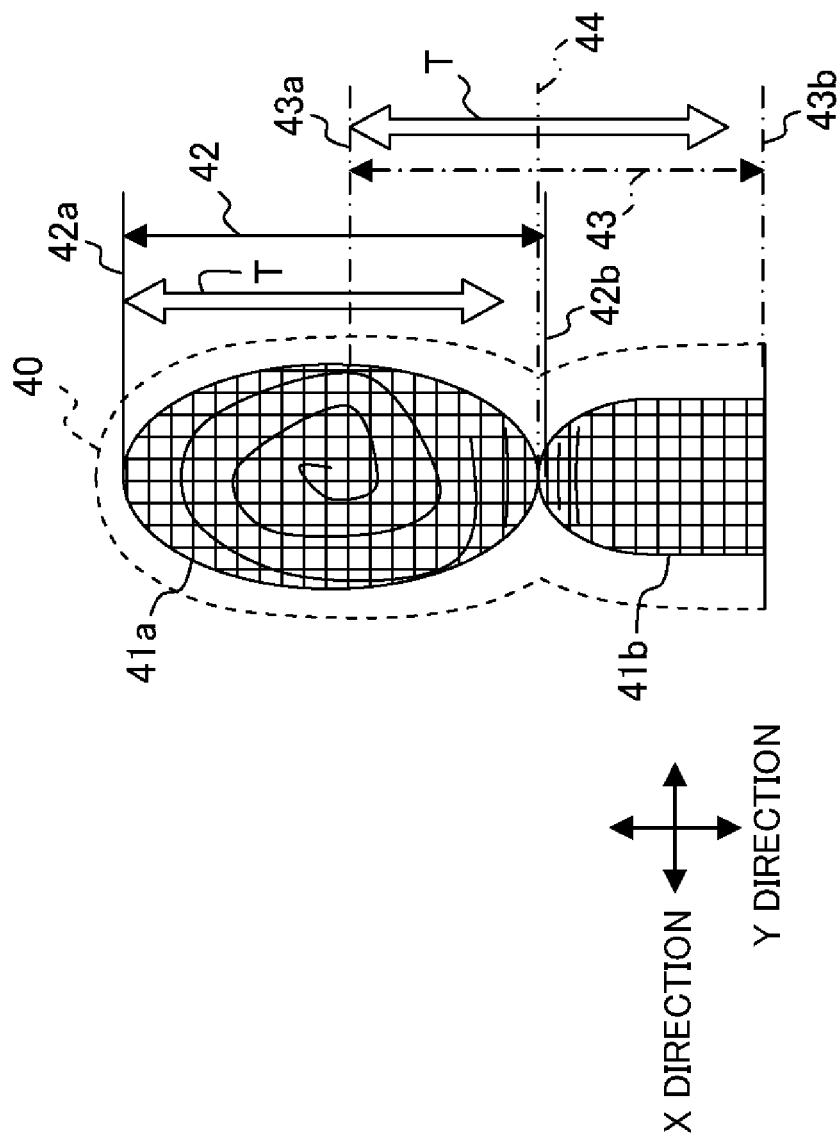
FIG. 13 is a diagram illustrating processing of the input status classification device in the biometric authentication apparatus as the first embodiment.

Here, the processing of the above Step 30 by the input status classification device 15-1 will be described in more detail with reference to FIG. 13. In FIG. 13, the broken line 40 illustrates the outline of a finger, and the shaded area 41*a* and 41*b* illustrate where the fingerprint is collected. When the fingerprint is collected in the range indicated by Bidirectional arrow 42 (range from the solid line 42*a* to the solid line 42*b*) by the biometric information input device 11, the distance from the solid line 42*a* that is finger tip to the chain double-dashed line 44 indicating the narrowing position is sufficiently longer than the predetermined value $T_{Length}$ (Outlined arrow T in the drawing). In such a case, the input status classification device 15-1 determines that fingerprint image as a pass status (Step S31).

In contrast, when the fingerprint is collected in the range indicated by Bidirectional arrow 43 (range from the long and short dashed line 43*a* to the long and short dashed line 43*b*) by the biometric information input device 11, the distance from the long and short dashed line 43*a* that is an end on the finger tip side in the fingerprint image to the chain double-dashed line 44 indicating the narrowing position is shorter than the predetermined value $T_{Length}$ (Outlined arrow T in the drawing). In such a case, the input status classification device 15-1 determines fingerprint image as a fail status (Step S32).

Subsequently, the input status classification device 15-1 determines whether or not the ridge orientations near the narrowing position are concentrated to the direction perpendicular to the longitudinal direction of the finger ($\theta\perp$) (Step S33).

Specifically, when the difference between the average of all of the ridge orientations near the narrowing position (divided image in this example) detected by the ridge orientation detection device 14 (i.e., ridge orientations of all of the small areas 30*b* in FIG. 3 described above) and the X direction is equal to or smaller than a predetermined value, and, when the standard deviation (or variance) as a value indicating a variation in the average is equal to or smaller than a predetermined value, the input status classification device 15-1 determines that the ridge orientations near the narrowing position are concentrated to the direction perpendicular to the longitudinal direction of the finger (the Yes route in Step S33). The input status classification device 15-1 determines a fail status of that fingerprint image as a fail status in which a joint ("distal joint" in the drawing) is inputted (Step S34), and terminates the processing.

Figure 14:
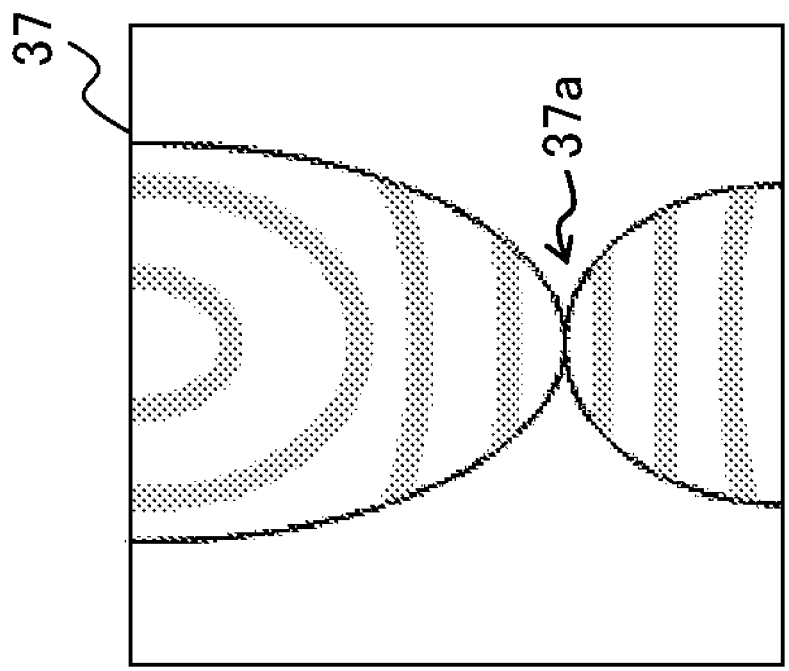
FIG. 14 is a diagram illustrating processing of the input status classification device in the biometric authentication apparatus as the first embodiment.

Accordingly, in a fingerprint image 37 in which the narrowing position 37*a* is located at the joint portion as depicted in FIG. 14, since the ridge orientations near the narrowing position 37*a* are concentrated to the X direction, the input status classification device 15-1 determines that such a fingerprint image 37 is in a fail status in which a joint is inputted.

In contrast, when the difference between the average and the X direction is greater than the predetermined value, or when the standard deviation (or variance) as a value indicating a variation in the average is greater than the predetermined value, the input status classification device 15-1 determines that the ridge orientations near the narrowing position are not concentrated to the direction perpendicular to the longitudinal direction of the finger (the No route in Step S33). The input status classification device 15-1 determines a fail status of that fingerprint image as a fail status due to an imperfect input (Step S35), and terminates the processing.

Accordingly, since the narrowing position 36*b* is located at the central portion of the finger in the fingerprint image 36 depicted in FIG. 12 and thus the ridge orientations near the narrowing position 36*b* are not directed to the X direction, the input status classification device 15-1 determines such a fingerprint image 36 as a fail status in which an imperfect input is made.

(1-3) Advantageous Effects of Biometric Authentication Apparatus 1-1 (Biometric Information Sensing Apparatus 10-1) as First Embodiment As described above, according to the biometric authentication apparatus 1-1 (biometric information sensing apparatus 10-1 and biometric information collection method) as the first embodiment, the width detection device 12-1 (width detection Step S2) that detects a width of a fingerprint in a fingerprint image collected by the biometric information input device 11 (collection Step S1), the position detection device 13-1 (narrowing position detection Step S3) that detects the narrowing position of a finger in the fingerprint image on the basis of the width, the ridge orientation detection device 14 (orientation information obtainment Step S4) that obtains orientation information related to the fingerprint in the fingerprint image, and the input status classification device 15-1 (determination Step S5) that determines a collection status of the fingerprint image on the basis of the ridge orientations near the narrowing position are included, it is possible to determine whether the narrowing position is a joint or caused by an imperfect input. As a result, it is possible to precisely determine a collection status of the fingerprint image. That is, it is possible to reliably determine whether the collection status of the fingerprint image is a fail status in which a joint is inputted, or a fail status due to an imperfect input.

For example, a fail status due to an imperfect input which is obtained by a wrong input operation of capturing biometric information with the biometric information input device 11 (sweep type fingerprint sensor) while bending the finger can be distinguished from a status in which a joint is inputted.

In addition, since the input status classification device 15-1 determines a collection status on the basis of the position of the narrowing position in the fingerprint image, it is possible to precisely determine pass or fail of the collection status of the fingerprint image.

That is, the input status classification device 15-1 determines pass or fail of the fingerprint image as a collection status according to the length from narrowing position to the finger tip in the fingerprint image. More specifically, when the length is equal to or greater than a predetermined value, the input status classification device 15-1 determines the fingerprint image as pass. In contrast, when the length is shorter than the predetermined value, the fingerprint image is determined as fail. Thus, it is possible to determine a fingerprint image including the central portion of the finger tip that is suitable for personal authentication complex pattern as a good collection status, and determines others as a failed collection status.

In other words, since the input status classification device 15-1 determines a collection status according to the length from narrowing position to the finger tip in the fingerprint image, even when a joint or a narrowing position due to an imperfect input is detected, a determination of good can be made when this length is equal to or greater than the predetermined value. Thus, a good fingerprint image that can be used for personal authentication can be reliably classified.

In addition, since the biometric authentication device 17 performs a biometric authentication using a fingerprint image that is determined as having a good collection status by the input status classification device 15-1, the precision of authentication can be improved.

Furthermore, since the input status classification device 15-1 determines a type of fail status by determining whether or not narrowing position is a joint of the finger on the basis of the distribution of the ridge orientations as orientation information near the narrowing position when a fingerprint image is determined as fail, it is possible to reliably determine whether the fail status is a fail status in which a joint is inputted, or a fail status due to an imperfect input.

Specifically, when the difference between the average of the ridge orientations and the direction that is perpendicular to the longitudinal direction of the finger in the fingerprint image is equal to or smaller than a predetermined value, and, a value indicating the variation related to the average is equal to or smaller than a predetermined value, the input status classification device 15-1 determines that the narrowing position is a joint of the finger. Thus, it is possible to more precisely determine the type of the fail status, using the fact that the fingerprint of joint portion is concentrated to the direction perpendicular to the longitudinal direction of the finger.

In addition, the width detection device 12-1 is configured to detect the longitudinal direction of a finger in a fingerprint image by the inclination information detection device 12*a*, and detects a width for each of a plurality of divided images that is obtained by dividing the fingerprint image in the longitudinal direction of the finger. The position detection device 13-1 detects a position of a divided image that has a width smaller than the width of both of adjacent divided images in the longitudinal direction, as a narrowing position. Thus, even when a finger is inclined in a fingerprint image since the slide direction or placement of the finger with respect to the collection surface is not proper, the width of the fingerprint can be precisely detected taking the inclination into account, and the narrowing position can be detected reliably and precisely. Furthermore, as a result of this, the input status classification device 15-1 can also determine a collection status considering an inclination of a finger in a fingerprint image, which makes the determination more precise.

In addition, the ridge orientation detection device 14 detects ridge orientations, taking the inclination detected by the inclination information detection device 12*a* into account, that is, the ridge orientations are detected on the basis of divided images considering the inclination, as described with reference to FIG. 3. As a result, the inclination of the fingerprint image is considered, resulting in a more precise detection of ridge orientations. In addition, as a result of this, the input status classification device 15-1 can also determine a collection status considering an inclination of a finger in a fingerprint image, which makes the determination more precise.

Note that, when a plurality of divided images that have the contact widths smaller than the contact widths of the adjacent divided images in the longitudinal direction are detected, the position detection device 13-1 detects, as the second narrowing position, a position of a divided image that has the smallest contact width from the plurality of the divided images. Thus, it is possible to reliably detect a single narrowing position for one fingerprint image.

In addition, the position detection device 13-1 detects a narrowing position after performing smoothing on a plurality of widths of a plurality of divided images detected by the width detection device 12-1, using a filter having a wider range than a ridge distance. Thus, as described with reference to FIGS. 10(*a*) and (*b*) described previously, erroneous detection of a position that is not the actual narrowing as a narrowing position due to the relationship between the ridge distance and the height of a divided image (width in the Y direction) can be prevented. In addition, it is possible to reliably detect a true narrowed position in a fingerprint image as a narrowing position, and a candidate for a narrowing position can be detected in a fingerprint image that is inputted when the surface of a finger is blurred or the finger has a scar or the finger is wrinkled.

Furthermore, the position detection device 13-1 detects a narrowing position according to whether or not being smaller than the average of the widths of all divided images detected by the width detection device 12-1 as depicted in Step S21 in FIG. 9 described above. Thus, the efficiency of the detection processing can be improved. In addition, by detecting a width that is smaller than the average as a candidate for a narrowing position, even when a fingerprint image is inputted when the surface of a finger is blurred or the finger has a scar or the finger is wrinkled, an erroneous determination of a good fingerprint image as a imperfect status can be prevented.

Note that since a display device is provided which makes notification (displays) according to a collection status of a fingerprint image determined by the input status classification device 15-1, the user (authenticating person) can be informed of whether or not his or her fingerprint input is proper, and be notified with a right input operation according to the collection status when an improper input is made.

(2) Description of Second Embodiment of the Present Invention

Next, the configuration of a biometric authentication apparatus 1-2 (biometric information sensing apparatus 10-2) as a second embodiment of the present invention will be described with reference to the block diagram depicted in FIG. 15. Note that reference symbols that are the same as the reference symbols that have been described previously refer to the same or similar elements.

Figure 15:
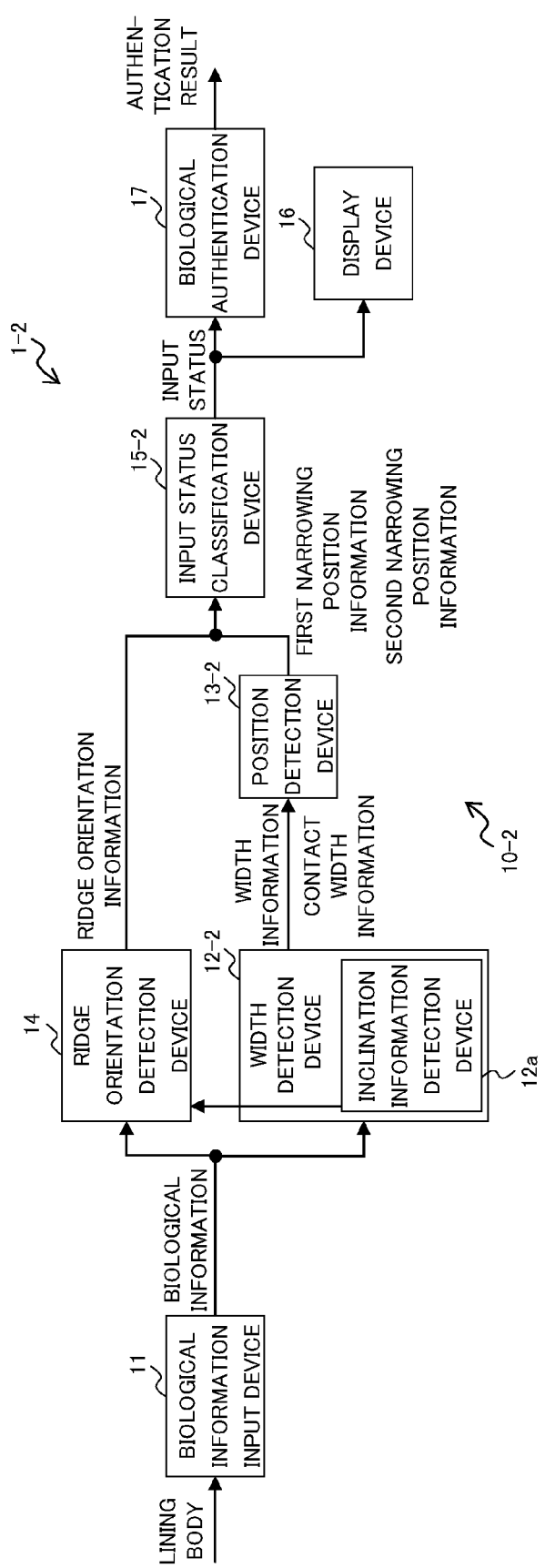
FIG. 15 is a block diagram illustrating the configuration of a biometric authentication apparatus as a second embodiment.

As depicted in FIG. 15, the biometric authentication apparatus 1-2 is configured similarly to the biometric authentication apparatus 1-1 of the above-described first embodiment, except for the configurations of a width detection device 12-2, a position detection device 13-2, and an input status classification device 15-2.

In the biometric authentication apparatus 1-2, the width detection device 12-2 is configured to detect, in addition to detecting a width by the width detection device 12-1 in the biometric authentication apparatus 1-1 of the above-described first embodiment, a net contact width that is obtained by subtracting a width of a non-contacting part of a finger with respect to a collection surface (i.e., a collection surface of a fingerprint sensor as the biometric information input device 11) from that width.

The position detection device 13-2 and the input status classification device 15-2 are configured to perform the similar processing for a width detected by the width detection device 12-1 on a contact width detected by the width detection device 12-2, as well as processing by the position detection device 13-1 and the input status classification device 15-1 in the biometric authentication apparatus 1-1 of the above-described first embodiment.

Specifically, the width detection device 12-2 detects a full width of a fingerprint for each divided image as a width of the fingerprint in a fingerprint image, like the first embodiment and also detects a contact width in which the finger actually makes a contact to the collection surface for each divided image.

Figure 16:
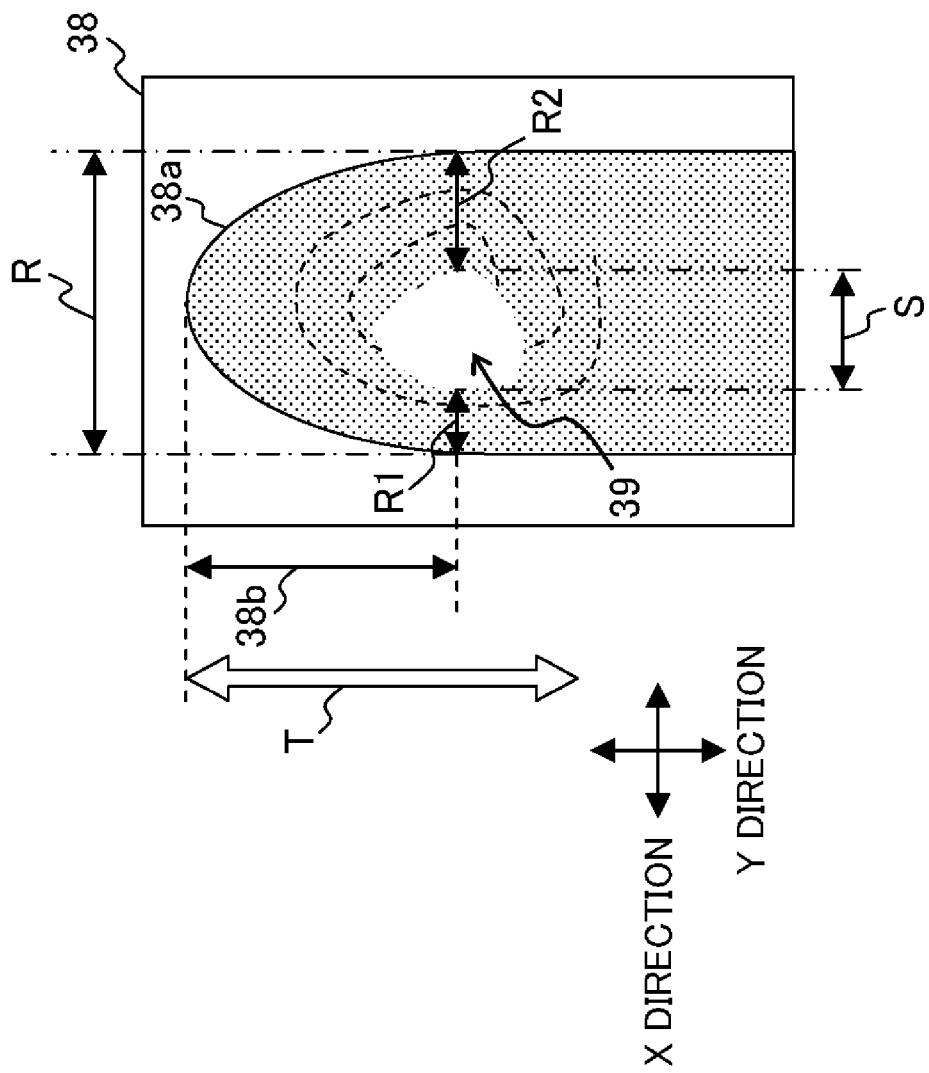
FIG. 16 is a diagram illustrating processing of a width detection device in the biometric authentication apparatus as the second embodiment.

For example, for a fingerprint image 38 having a fingerprint 38a depicted in FIG. 16, the width R (Bidirectional arrow R in the drawing) is detected as the width of the fingerprint, and the width S of an unclear portion 39 where a fingerprint is missing (Bidirectional arrow S in the drawing) in the fingerprint 38a is also detects. Then the width obtained by subtracting the width S from the width R (i.e., sum of the width R1 and the width R2) is detected as a contact width.

The width detection device 12-2 detects the width of a region wider than the valley width in the width R as the unclear width S.

Note that the unclear portion 39 appears in a fingerprint image when the epidermis of a finger is cornified, or a part of the epidermis is peeled off for some reasons, such as an injury, or when the pressing force of a finger against the collection surface is insufficient, for example.

The position detection device 13-2 detects narrowing position on the basis of both of a width and a contact width detected by the width detection device 12-2.

That is, the position detection device 13-2 detects a first narrowing position on the basis of the width detected by the width detection device 12-2, similar to the first embodiment described previously, and detects a second narrowing position on the basis of the contact width detected by the width detection device 12-2.

More specifically, the position detection device 13-2 detects, as a second narrowing position as the narrowing position, a position of a divided image that has the contact width smaller than the contact width of an adjacent divided image in the longitudinal direction of the finger. When a plurality of divided images that have the contact widths smaller than the contact widths of the adjacent divided images in the longitudinal direction are detected, the position detection device 13-2 detects, as the second narrowing position, a position of a divided image that has the smallest contact width from the plurality of the divided images.

Accordingly, in the example depicted in FIG. 16, the position detection device 13-2 does not detect a first narrowing position, but detects the portion of the width R (position of this divided image) as a second narrowing position.

Here, a method for detecting a second narrowing position on the basis of a contact width by the position detection device 13-2 is the same as the method for detecting a first narrowing position, and the position detection device 13-2 detects a second narrowing position using the procedure depicted in the flowchart of FIG. 9 described above.

Accordingly, according to the position detection device 13-2, there are cases in which only a first narrowing position is detected, or cases in which only a second narrowing position is detected, as in the example depicted in FIG. 16, or cases in which both a first narrowing position and a second narrowing position are detected.

Figure 17:
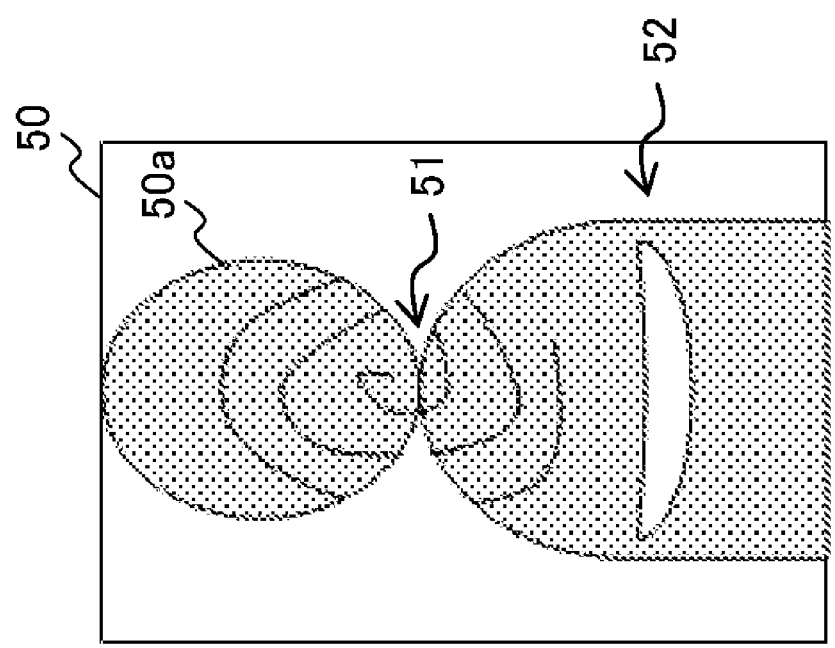
FIG. 17 is a diagram illustrating processing of the position detection device in the biometric authentication apparatus as the second embodiment.

For example, for a fingerprint 50a in a fingerprint image 50 depicted in FIG. 17, the position detection device 13-2 detects a region around the portion indicated by Arrow 51 as a first narrowing position, and detects a region around the portion indicated by Arrow 52 as a second narrowing position.

Figure 18:
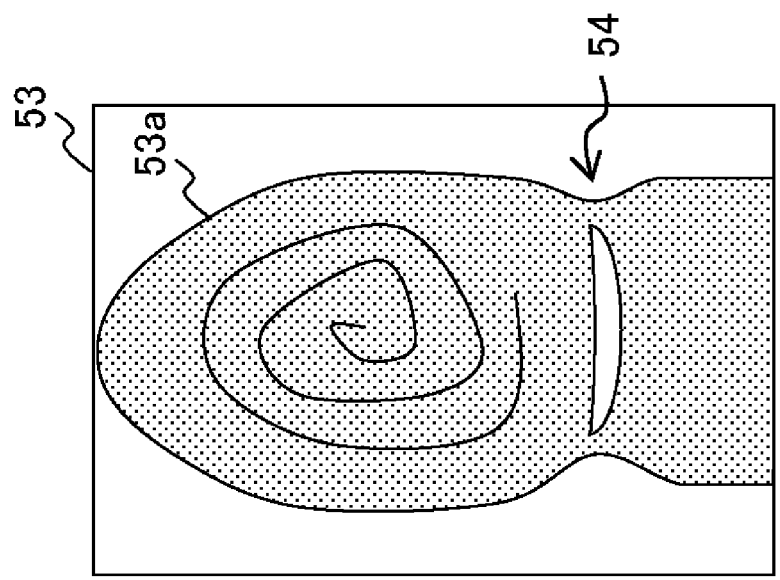
FIG. 18 is a diagram illustrating processing of the position detection device in the biometric authentication apparatus as the second embodiment.

In addition, for a fingerprint 53a in a fingerprint image 53 depicted in FIG. 18, the position detection device 13-2 detects a region around the portion indicated by the reference symbol 54 as a first narrowing position and a second narrowing position.

The input status classification device 15-2 determines a collection status of a fingerprint image in the manner similar to the method in the above-described first embodiment for the first narrowing position and/or second narrowing position detected by the position detection device 13-2.

Figure 11:
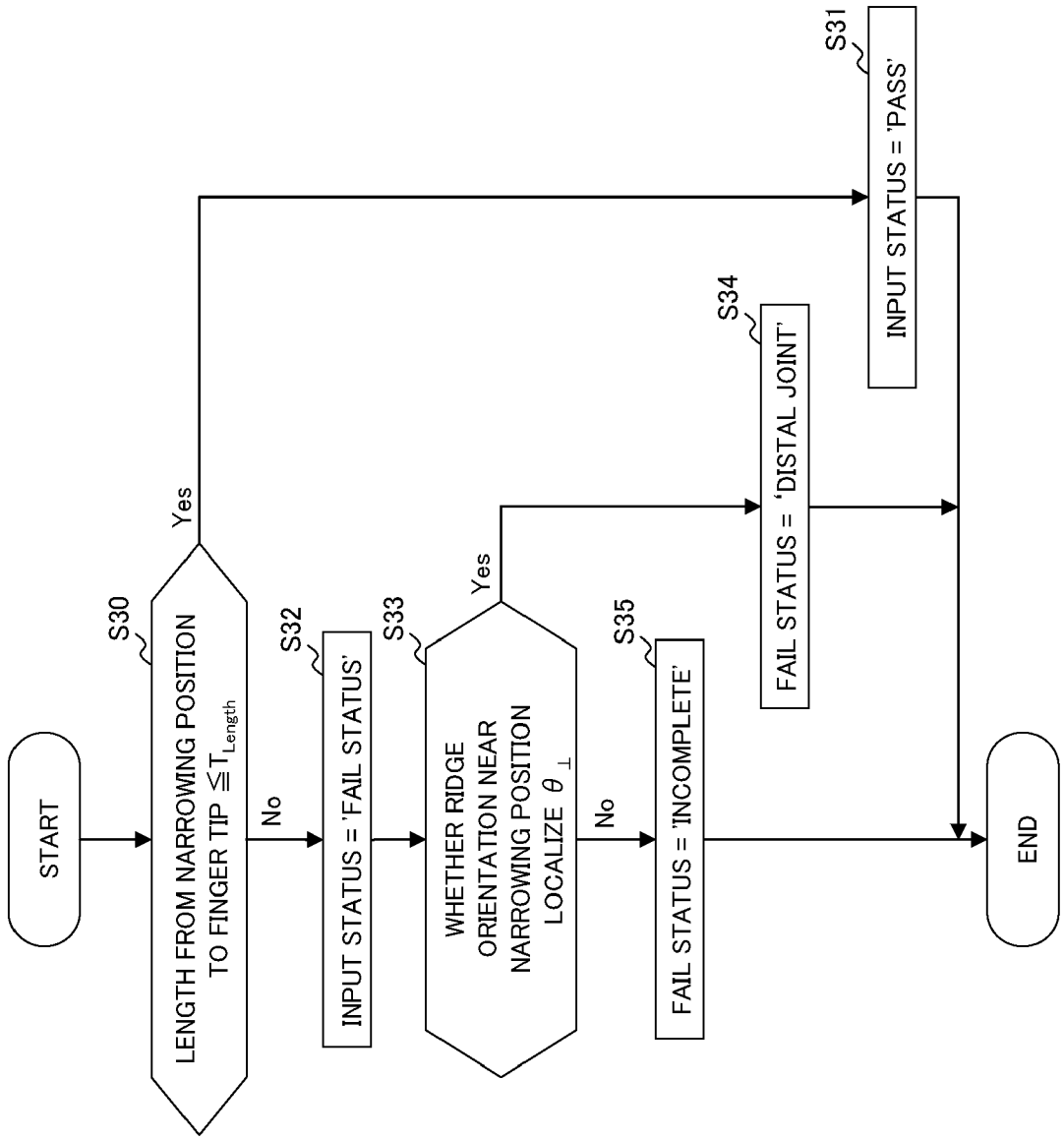
FIG. 11 is a flowchart illustrating one example of the operational procedure of an input status classification device in the biometric authentication apparatus as the first embodiment.

That is, the input status classification device 15-2 determines, for a second narrowing position, a collection status of an fingerprint image from which the second narrowing position is detected, using the procedure depicted in the flowchart in FIG. 11 described above.

Accordingly, the input status classification device 15-2 determines a collection status of the fingerprint image 38, depicted in FIG. 16, for example, as fail since the length 38b from the finger tip to the second narrowing position is shorter than the predetermined value $T_{width}$ (in the drawing Bidirectional arrow T).

In addition, since the ridge orientations at the second narrowing position in the fingerprint image 38 are not concentrated to the X direction, the input status classification device 15-2 determine that the fingerprint image 38 is in a fail status due to an imperfect input.

In this situation, when the fingerprint image is determined as a fail status on the basis of one of the first narrowing position and the second narrowing position, the input status classification device 15-2 determines the fingerprint image as a fail status even when the fingerprint image is determined as a pass status based on the other.

That is, the input status classification device 15-2 determines a fingerprint image as pass only when it is determined as a pass status on the basis of all narrowing positions detected by the position detection device 13-2.

In addition, when a type of fail status on the basis of a first narrowing position is different from that on the basis of a second narrowing position (whether a fail status due to an imperfect input, or a fail status in which a joint is inputted), the input status classification device 15-2 determines the fingerprint image is in a fail status in which both fail statuses are applicable.

Accordingly, in such a case, the display device 16 performs both a notification (message display) according to a fail status due to an imperfect input, and a notification (message display) according to a fail status in which a joint is inputted.

As described above, according to the biometric authentication apparatus 1-2 (biometric information obtainment apparatus 10-2) as the second embodiment, the advantages that are similar to those in the above-described first embodiment can be obtained. In addition, since the width detection device 12-2 detects a contact width and the position detection device 13-2 detects a second narrowing position on the basis of the contact width, the input status classification device 15-2 determines a collection status of a fingerprint image on the basis of the second narrowing position. Thus, it is possible to determine, as a fail status, a fingerprint in an imperfect collection status image including a portion in which the differences between ridges and valleys become locally unclear in an fingerprint because the epidermis of a finger is cornified, or a part of the epidermis is peeled off for some reasons, such as an injury, or the finger is wrinkled. In addition, since such a fail status can be distinguished from a fail status in which a joint is inputted, it is possible to determine a collection status of a fingerprint image more precisely and more in detail.

In addition, the position detection device 13-2 detects a second narrowing position on the basis of a contact width and the input status classification device 15-2 determines a collection status of a fingerprint image on the basis of the second narrowing position. Thus, even when no first narrowing position is detected since the outline of a fingerprint in the fingerprint image is not significantly narrowed, as illustrated in FIG. 16, for example, it is possible to detect an unclear portion, if any, in which the fingerprint is not collected, as a second narrowing position. As a result, it is possible to reliably detect by the input status classification device 15-2 that that fingerprint image is in a fail status due to an imperfect input. Note that this further enhances the precision of authentication made by the biometric authentication device 17.

Furthermore, when a plurality of divided images that have the contact widths smaller than the contact widths of the both adjacent divided images in the longitudinal direction are detected, the position detection device 13-2 detects, as the second narrowing position, a position of a divided image that has the smallest contact width from the plurality of the divided images. Thus, it is possible to reliably detect a single second narrowing position from a fingerprint image.

(3) Description of Variant of the Embodiments

Note that the present invention is not restricted to the embodiments described above, and various modifications may be made without departing from the spirit of the present invention.

(3-1) First Variant

In the above-described first and second embodiments are configured such that, the input status classification device 15-1 or 15-2 determines a type of fail status on the basis of whether ridge orientations near a narrowing position (first narrowing position or second narrowing position) are concentrated to the X direction, as depicted in Step S33 in FIG. 11 described above. The present invention is not limited to this.

For example, the width detection device 12-1 or 12-2 may be configured to detect a width of a non-contacting part of a finger (hereinafter, referred to "non-contacting width") with respect to a collection surface. When performing processing on the basis of a first narrowing position, the input status classification device 15-1 or 15-2 may be configured to determine whether the first narrowing position is a joint or caused by an imperfect input on the basis of the value of the non-contacting width at the first narrowing position detected by the width detection device 12-1 or 12-2, or the ratio of the non-contacting width to the width at the first narrowing position, in addition to the processing in the above Step S33.

Specifically, the input status classification device 15-1 or 15-2 may be configure to, when the value of the non-contacting width at the first narrowing position, or the ratio of the non-contacting width to the full width of the first narrowing position is equal to or greater than a predetermined value, determine that the first narrowing position is a joint of the finger and determine that the fingerprint image is in a fail status in which a joint is inputted. Otherwise, the input status classification device 15-1 or 15-2 may be configure to, when the value or ratio is smaller than a predetermined value, determine that the first narrowing position is caused by an imperfect input and determine that the fingerprint image in a fail status due to an imperfect input (in this example, caused by bending of the finger or the like).

This configuration is adapted to employ a non-contacting part which has no a contact to a collection surface of a fingerprint sensor and which is increased near a joint of the finger due to the shape of the finger or the feature of the fingerprint of the joint portion, and to determine that the narrowing position is a joint when the non-contacting part is larger (i.e., the value of the non-contacting width is greater, or the ratio of the non-contacting width is greater).

Thereby, the input status classification device 15-1 or 15-2 can determine a collection status of a fingerprint image more efficiently and more precisely.

Note that the above determination processing on the basis of the value of the non-contacting width or the ratio of the non-contacting width may be performed as an AND condition or an OR condition for the processing in Step S33 in FIG. 11 described above.

(3-2) Second Variant

In addition, the input status classification device 15-1 or 15-2 may be configured to determine whether a narrowing position is a joint or is caused by an imperfect input on the basis of the variation in ridge orientations on the finger tip side of a narrowing position (first narrowing position or second narrowing position), in addition to the processing in the above Step S33.

Specifically, the input status classification device 15-1 or 15-2 is adapted to determine that, when a value indicating the variation of ridge orientations (standard deviation or variance) on the finger tip side of a narrowing position in a fingerprint image is equal to or smaller than a predetermined value, the narrowing position is a joint of the finger and the fingerprint image is in a fail status in which a joint is inputted. Otherwise, the input status classification device 15-1 or 15-2 is adapted to determine that, when the value indicating a variation is greater than a predetermined value, the narrowing position is caused by an imperfect input and the fingerprint image is in a fail status due to an imperfect input.

This configuration employs the fact that a fingerprint suitable for authentication has a greater variation in ridge orientations since such a fingerprint is the central portion from a distal joint to the finger tip in which the ridges tend to have an eddy or looped shape or a higher curvature of the ridges. Thus, since it is possible to determine that such a central portion is included in a fingerprint image when a value indicating the variation of ridge orientations is greater, it is determined that fingerprint image is in a fail status due to an imperfect input. Otherwise, it is determined that the fingerprint image is in a fail status in which a joint is inputted when a value indicating the variation of ridge orientations is small.

Thereby, the input status classification device 15-1 or 15-2 can determine a collection status of a fingerprint image more efficiently and more precisely.

Note that the above determination processing on the basis of the value of the non-contacting width or the ratio of the non-contacting width may be performed as an AND condition or an OR condition for the processing in Step S33 in FIG. 11 described above.

(3-3) Third Variant

Figure 19:
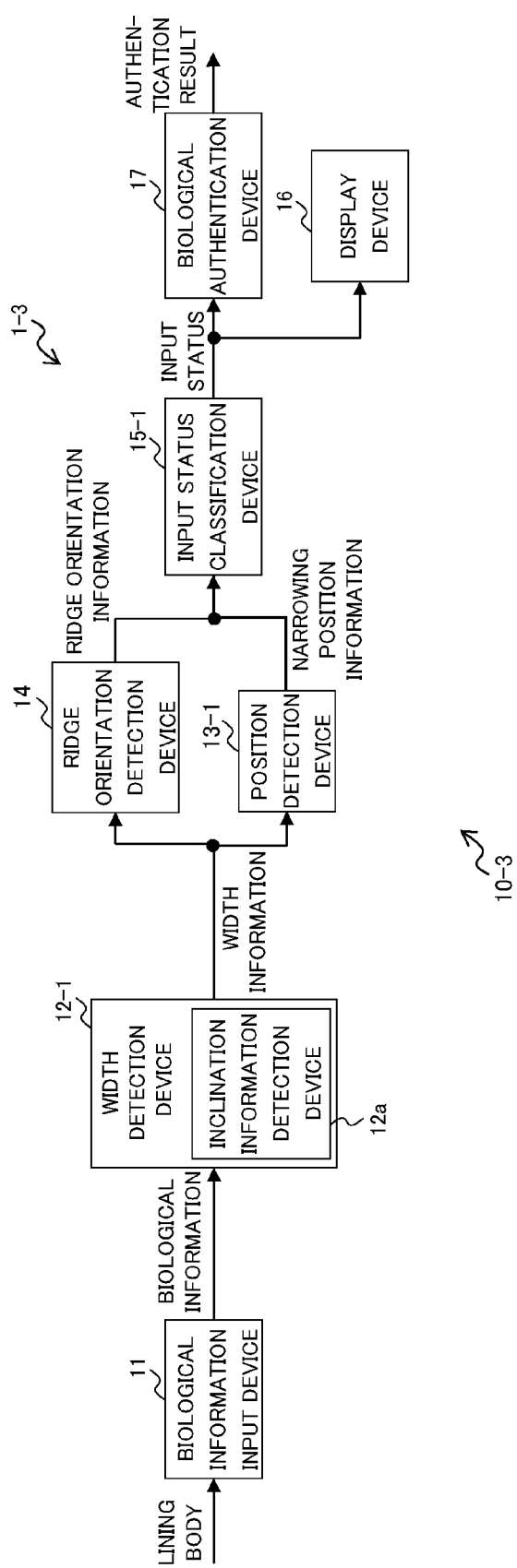
FIG. 19 is a block diagram illustrating the configuration of a biometric authentication apparatus as a variant of the embodiments.

Although the above-described first and second embodiments have been described with reference to the example in which, the processing of the width detection device 12-1 or 12-2 and the processing of the ridge orientation detection device 14 are performed in parallel, the present invention is not limited to this. As depicted in FIG. 19, after the processing of the width detection device 12-1, the ridge orientation detection device 14 may perform processing using the processing result from the width detection device 12-1.

Since the biometric authentication apparatus 1-3 or the biometric information sensing apparatus 10-3 may be incorporated into a compact information device, such as a cellular phone or a PDA that has a limited amount of memory, it is preferable to reduce the amount of memory or the amount of computation required for the processing.

Accordingly, the width detection device 12-1 may detect a region in which ridges exist (that is, range in which a width is detected) and the ridge orientation detection device 14 may perform ridge orientation detection processing on divided images in which the width is detected by the width detection device 12-1 before detecting ridge orientations by the ridge orientation detection device 14. Thereby, since ridge orientation detection processing can be omitted for a region in which no fingerprint exists, it is possible to reduce the memory space and the amount of computation for storing ridge orientations, resulting in a more efficient and faster execution of the ridge orientation detection processing.

Note that, although FIG. 19 is a diagram illustrating a variant of the first embodiment, the processing of the position detection device 13-2 and the processing of the ridge orientation detection device 14 may be performed in parallel after the processing of the width detection device 12-2 in the second embodiment, which also provides the similar advantageous effects.

(3-4) Forth Variant

Figure 20:
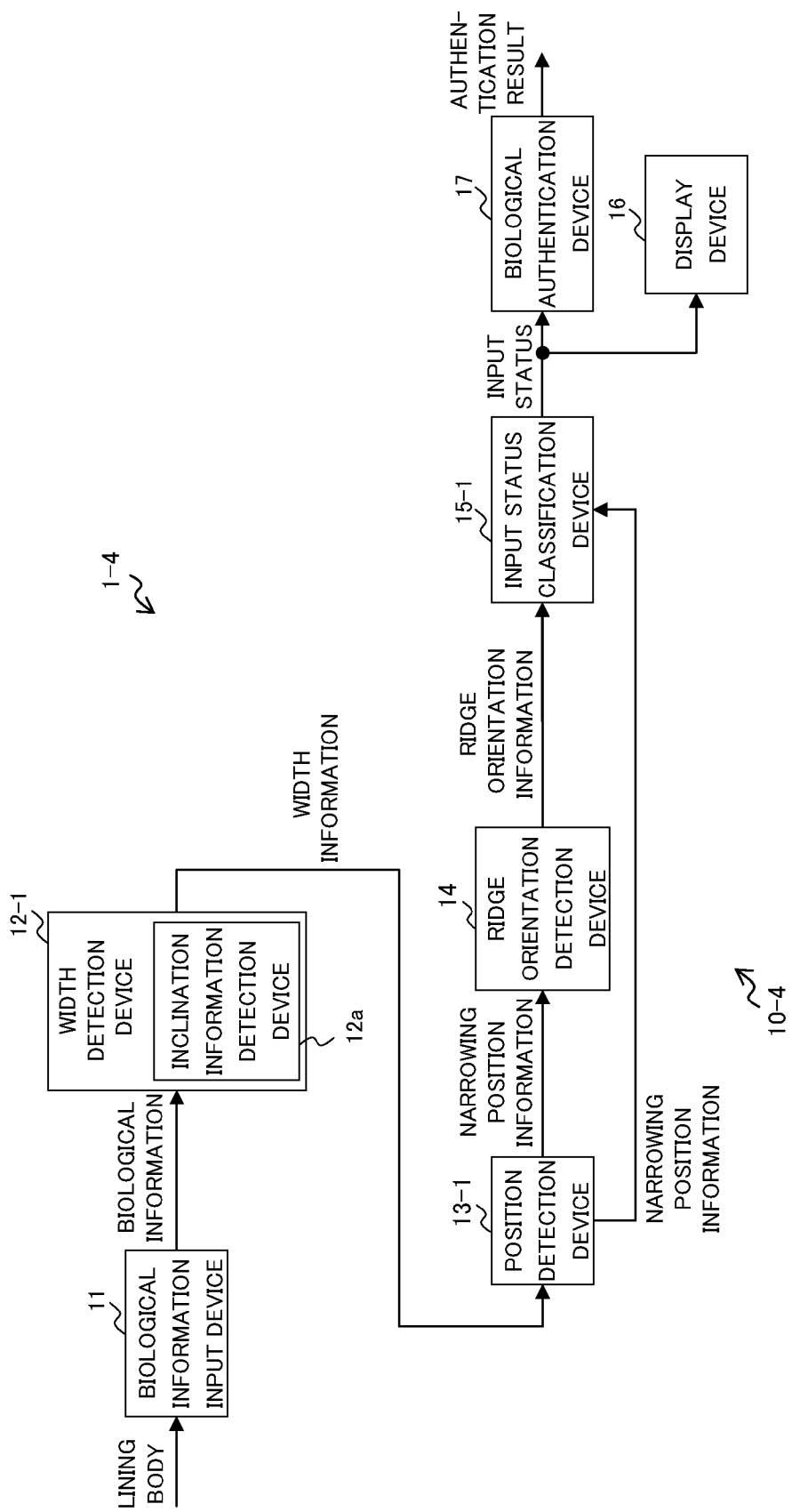
FIG. 20 is a block diagram illustrating the configuration of a biometric authentication apparatus as a variant of the embodiments.

In addition, although the above-described first and second embodiments have been described with reference to the example in which, the processing of the width detection device 12-1 or 12-2 and the processing of the ridge orientation detection device 14 are performed in parallel, the present invention is not limited to this. As depicted in FIG. 20, after the processing of the width detection device 12-1 and the position detection device 13-1, the ridge orientation detection device 14 may perform it processing using the processing result (narrowing position).

In this case, since the ridge orientation detection device 14 only detects ridge orientations for a narrowing position detected by the position detection device, the processing can be performed more efficiently and faster than in the above-described third variant, and usage of hardware resources, such as the memory, may be more reduced.

Note that, although FIG. 20 is a diagram illustrating a variant of the first embodiment, the processing of the processing of the ridge orientation detection device 14 may be performed after the processing of the position detection device 13-2 in the second embodiment, which also provides the similar advantageous effects.

(3-5) Other Variants

If the biometric information input device 11 is a sweep type fingerprint sensor, a regeneration device 18 may be included after the biometric information input device 11 as depicted in FIG. 21, which regenerates a fingerprint image by using the shift amount and shift direction of a living body when a height (length in the Y direction) of a single fingerprint image is smaller than the minimum necessary height that is required by the ridge orientation detection device 14 for calculating ridge orientations.

The regeneration processing by the regeneration device 18 may be performed using any well-known techniques (for example, the technique disclosed in Japanese Patent No. 3859673).

Thereby, the width detection device 12-1 and the ridge orientation detection device 14 can reliably perform the processing.

Note that, although the above-described embodiments are configured such that the position detection device 13-1 or 13-2 detects a narrowing position using the operational procedure indicated in the flowchart in FIG. 9 described previously, the present invention is not limited to this. A narrowing position may be detected by the operational procedure indicated in the flowchart in FIG. 22 (Step S20', S21 to S25), for example. Note that reference symbols in FIG. 22 which are the same as the reference symbols in FIG. 9 refer to the same processing or similar processing.

Figure 22:
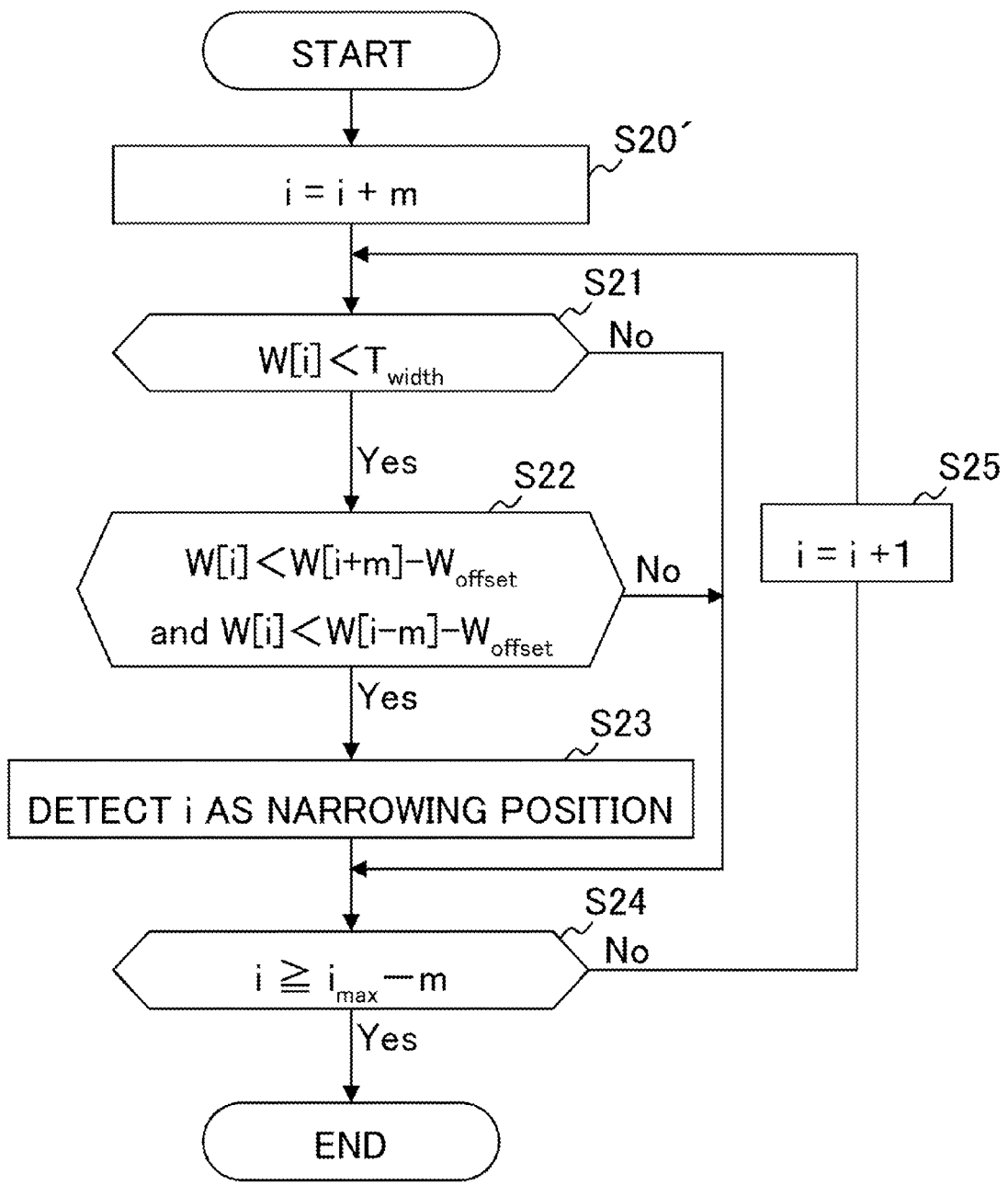
FIG. 22 is a flowchart illustrating one example of the operational procedure of a position detection device in the biometric authentication apparatus as a variant of the embodiments.

That is, the above-described embodiments are configured such that the position detection device 13-1 or 13-2 starts processing by adding "m+1" to the counter value (see Step S20), and again adds "m+1" to the counter value i every time it is determined in Step S24 that the counter value is not equal to or greater than the number obtained by subtracting "m" from the maximum value of the counter value (the No route in Step S24). Alternatively, as depicted in FIG. 22, the position detection device 13-1 or 13-2 may be configured to start processing by adding "m" to the counter value (Step S20'), and increment the counter value by one (Step S25) every time it is determined in Step S24 that the counter value is not equal to or greater than the number obtained by subtracting "m" from the maximum value of the counter value (the No route in Step S24).

Thereby, the position detection device 13-1 or 13-2 can reliably detect a narrowing position, like in the above-described embodiments.

In addition, although the above-described embodiments have been described with reference to the example in which the display device 16 displays a message on a display screen, the present invention is not limited to this. Alternatively or additionally to displaying a message on a display screen, the display device 16, as a notification device, may be configured to make a notification by a sound, thereby the user can informed of a collection status of a fingerprint image or how to make input again, more precisely and reliably.

Furthermore, although the above-described embodiments are configured such that the width detection device 12-1 or 12-2 detects a plurality of widths on the basis of divided images, the present invention is not limited to this. When the biometric information input device 11 is a sweep type fingerprint sensor, the width detection device 12-1 or 12-2 may be configured to detect widths (i.e., W[i] in FIG. 9) for each strip image that is a unit of input of the fingerprint sensor.

That is, when each divided image 30a corresponds to a strip image inputted by the sweep type fingerprint sensor indicated in FIG. 2, the width detection device 12-1 or 12-2 may be configured to detect a width for each strip image 30a without performing further processing on the strip image 30a. In this case, the regeneration processing by the regeneration device 18 or the processing for dividing a fingerprint image by the width detection device 12-1 or 12-2 can be performed more efficiently and faster.

Note that, although the above-described embodiments are configured such that the width detection device 12-2 detects contact widths as W[i] in FIG. 9 and the position detection device 13-2 or the input status classification device 15-2 performs processing on the basis of the contact widths, the present invention is not limited to this. The width detection device 12-2 may detect, instead of a contact width, a non-contacting width or the ratio of the non-contacting width to a full width of a fingerprint as W[i] in FIG. 9, and the position detection device 13-2 or the input status classification device 15-2 may perform processing on the basis of the non-contacting width or the ratio, which also provides the similar advantageous effects to those of the above-described embodiments.

In addition, the above-described embodiments, the input status classification device 15-1 or 15-2 may correct ridge orientations detected by the ridge orientation detection device 14 using inclination information (the longitudinal direction of the finger) detected by the inclination information detection device 12a, and then perform determination processing of a collection status. Thereby, determination of a collection status may be more precise.

Furthermore, in the above-described embodiments, it is difficult to detect the longitudinal direction of a finger on the basis of a fingerprint image when the longitudinal direction of the finger in the fingerprint image inputted by the biometric information input device 11 is shorter than the width (X direction) of a collection surface. Thus, the input status classification device 15-1 or 15-2 may be configured to determine that a collection status of such a fingerprint image is in a fail status immediately after the fingerprint image is inputted. Thereby, failed fingerprint images from which no longitudinal direction is detected can be efficiently omitted without performing various types of processing.

In addition, in the above-described embodiments, when a fingerprint image has two or more fingerprint regions that are spaced apart each other, e.g., when regions (shaded areas) 41a and 41b from which a fingerprint is collected are spaced apart in a fingerprint image 40 depicted in FIG. 13, the position detection device 12-1 or 12-2 may be configured to detect the central portion of the space as a narrowing position, thereby, a collection status of the fingerprint image can be determined more precisely.

In addition, in such a case, before detecting a narrowing position by the position detection device 12-1 or 12-2, the input status classification device 15-1 or 15-2 may be configured to determine whether or not the distance from the end on the finger tip side of a fingerprint portion on the finger tip side (shaded area 41a in FIG. 13, for example) to the end on the palm side (distance along the Y direction) is shorter than the predetermined value $T_{width}$. The input status classification device 15-1 or 15-2 may be configured to determine that a collection status of that fingerprint image is in a fail status without performing processing of the position detection device 12-1 or 12-2 if the distance is determined to be shorter, and the position detection device 12-1 or 12-2 may detect a narrowing position if the distance is determined to be not shorter, thereby the efficiency of the processing can be improved.

Furthermore, although the above-described embodiments have been described with reference to the example in which biometric information collected by the biometric information input device 11 is a fingerprint, the present invention is not limited to this. The biometric information input device 11 may collect a palm print as biometric information, which also provides the similar advantageous effects to those of the above-described embodiments.

Note that the functions as the above-described width detection device 12-1 or 12-2, the inclination information detection device 12a, the position detection device 13-1 or 13-2, the ridge orientation detection device 14, the input status classification device 15-1 or 15-2, and the biometric authentication device 17 may be implemented by a computer (including a CPU, a biometric authentication apparatus, various terminals) that executes a predetermined application program (biometric authentication program or biometric information recognition program).

Such a program is provided in the form of a record on computer readable storage medium, for example, a flexible disk, CDs (such as a CD-ROM, CD-R, a CD-RW), DVDs (such as a DVD-ROM, a DVD-RAM, a DVD-R, a DVD-RW, a DVD+R, a DVD+RW). In this case, the computer reads a biometric authentication program or biometric information recognition program from that storage medium and uses that program after transferring it to the internal storage apparatus or external storage apparatus or the like. Alternatively, the program may be recorded on a storage device (storage medium), for example, a magnetic disk, an optical disk, a magneto-optical disk, or the like, and the program may be provided from the storage device to the computer via a communication line.

Here, the term "computer" may be a concept including hardware and an OS (operating system), and may refer to hardware that operates under the control of the OS. Alternatively, when an application program alone can make the hardware be operated without requiring an OS, the hardware itself may represent a computer. The hardware may include, at least a microprocessor, such as a CPU, and device to read a computer program stored on a storage medium.

An application program as the biometric authentication program described above includes program codes that make the computer to implement the functions as the width detection device 12-1 or 12-2, the inclination information detection device 12a, the position detection device 13-1 or 13-2, the ridge orientation detection device 14, the input status classification device 15-1 or 15-2, and the biometric authentication device 17. In addition, a part of the functions may be embodied by the OS, rather than the application program.

An application program as the biometric information recognition program described above includes program codes that make the computer implement the functions as the width detection device 12-1 or 12-2, the inclination information detection device 12a, the position detection device 13-1 or 13-2, the ridge orientation detection device 14, and the input status classification device 15-1 or 15-2. In addition, a part of the functions may be embodied by the OS, rather than the application program.

Furthermore, as the storage medium in this embodiment, other than a flexible disk, a CD, a DVD, a magnetic disk, an optical disk, or a magneto-optical disk, an IC card, a ROM cartridge, a magnetic tape, a punch card, an internal storage device (memory, such as a RAM or ROM) of the computer, an external storage device or the like, or any medium that is readable by the computer, including a printed medium having a code, such as a bar code, is printed thereon, may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A biometric information sensing apparatus, comprising:
   a collection device that collects a fingerprint image as a biometric information image of a biometric part;
   a width detection device that detects a width of the biometric part for each of a plurality of divided images that are obtained by dividing the fingerprint image, which is collected by the collection device, in the longitudinal direction of a finger;
   a narrowing position detection device that detects a narrowing position of the biometric part in the fingerprint image on the basis of the width;
   an orientation information obtainment device that obtains ridge orientations as orientation information related to the biometric part in the fingerprint image; and
   a determination device that determines a collection status of the fingerprint image on the basis of the ridge orientations near the narrowing position;
   wherein the narrowing position detection device detects, as a first narrowing position as the narrowing position, a position of a divided image that has the width smaller than the width of an adjacent divided image in the longitudinal direction.

2. The biometric information sensing apparatus according to claim 1, wherein the determination device determines the collection status on the basis of a position of the narrowing position in the biometric information image.

3. The biometric information sensing apparatus according to claim 1, wherein, when a plurality of divided images that have the widths smaller than the widths of the adjacent divided images in the longitudinal direction are detected, the narrowing position detection device detects, as the first narrowing position, a position of a divided image that has the smallest width from the plurality of the divided images.

4. The biometric information sensing apparatus according to claim 1, wherein
   the collection device collects a fingerprint image of a finger that makes a contact on a collection surface, as the biometric information image,
   the width detection device detects a contact width, for each of a plurality of divided images that are obtained by dividing the fingerprint image in the longitudinal direction of a finger, by subtracting the width of a non-contacting part of the finger with respect to the collection surface from the width of the fingerprint, and
   the narrowing position detection device detects, as a second narrowing position as the narrowing position, a position of a divided image that has the contact width smaller than the contact width of an adjacent divided image in the longitudinal direction.

5. The biometric information sensing apparatus according to claim 4, wherein, when a plurality of divided images that have the contact widths smaller than the contact widths of the adjacent divided images in the longitudinal direction are detected, the narrowing position detection device detects, as the second narrowing position, a position of a divided image that has the smallest contact width from the plurality of the divided images.

6. The biometric information sensing apparatus according to claim 2, wherein the determination device determines, as the collection status, a pass or fail of the fingerprint image according to the length from the narrowing position to a finger tip in the fingerprint image.

7. The biometric information sensing apparatus according to claim 6, wherein the determination device determines the fingerprint image as pass when the length from the narrowing position to the finger tip in the fingerprint image is equal to or longer than a predetermined value, and determines as fail when the length is shorter than the predetermined value.

8. The biometric information sensing apparatus according to claim 6, wherein the determination device, when determining the fingerprint as fail, determines a type of fail status by determining whether or not the narrowing position is a joint of the finger on the basis of a distribution of the ridge orientations as orientation information near the narrowing position.

9. The biometric information sensing apparatus according to claim 8, wherein the determination device determines the narrowing position as a joint of the finger when a difference between an average of the ridge orientations and the direction perpendicular to the longitudinal direction of the finger in the fingerprint image is equal to or smaller than a predetermined value, and when a value indicating the variation related to the average is equal to or smaller than a predetermined value.

10. The biometric information sensing apparatus according to claim 1, wherein
    the width detection device detects the width of a non-contacting part of the finger with respect to the collection surface at the first narrowing position, and
    the determination device determines that the first narrowing position is a joint of the finger and determines that the fingerprint image is a fail status in which the joint is inputted when a ratio of the width of a non-contacting part with respect to the width at the first narrowing position is equal to or greater than a predetermined value, and determines that the first narrowing position is an imperfect input and determines that the fingerprint image is in a fail status due to the imperfect input when the ratio is smaller than the predetermined value.

11. The biometric information sensing apparatus according to claim 1, wherein the determination device determines that the narrowing position is a joint of the finger and determines that the fingerprint image is a fail status in which the joint is inputted when a value indicating a variation in the ridge orientations on the finger tip side of the narrowing position in the fingerprint image is equal to or smaller than a predetermined value, and determines that the narrowing position is an imperfect input and determines that the fingerprint image is in a fail status due to the imperfect input when the value indicating the variation is greater than a predetermined value.

12. The biometric information sensing apparatus according to claim 1, wherein the narrowing position detection device detects the narrowing position after performing smoothing on the plurality of widths of the plurality of divided images detected by the width detection device, using a filter having a wider range than a ridge distance.

13. The biometric information sensing apparatus according to claim 1, further comprising a notification device that makes a notification according to a collection status of the biometric information image determined by the determination device.

14. A biometric information sensing method, comprising:
   collecting a fingerprint image as a biometric information image of a biometric part;
   detecting a width of the biometric part for each of a plurality of divided images that are obtained by dividing the fingerprint image, which is collected, in the longitudinal direction of a finger;
   detecting a narrowing position of the biometric part in the fingerprint image on the basis of the width;
   obtaining ridge orientations as orientation information related to the biometric part in the fingerprint image; and
   determining a collection status of the fingerprint image on the basis of the ridge orientations near the narrowing position;
   wherein the narrowing position is a position of a divided image that has the width smaller than the width of an adjacent divided image in the longitudinal direction is detected.

15. A computer-readable recording medium on or in which a biometric information sensing program that implements a function to determine a collection status of a biometric information image of a biometric part collected by a collection device that collects a fingerprint image as the biometric information image, is recorded, the program makes the computer function as:
   a width detection device that detects a width of the biometric part for each of a plurality of divided images that are obtained by dividing the fingerprint image, which is collected by the collection device, in the longitudinal direction of a finger;
   a narrowing position detection device that detects a narrowing position of the biometric part in the fingerprint image on the basis of the width;
   an orientation information obtainment device that obtains ridge orientations as orientation information related to the biometric part in the fingerprint image; and
   a determination device that determines a collection status of the fingerprint image on the basis of the ridge orientations near the narrowing position;
   wherein the program makes the computer function such that the narrowing position detection device detects, as a first narrowing position as the narrowing position, a position of a divided image that has the width smaller than the width of an adjacent divided image in the longitudinal direction.

16. The computer-readable recording medium on or in which the biometric information sensing program is recorded according to claim 15, wherein the program makes the computer function such that:
   the width detection device detects a contact width, for each of a plurality of divided images that are obtained by dividing a fingerprint image, which is obtained by the collection device as the biometric information image in the longitudinal direction of a finger, by subtracting the width of a non-contacting part of the finger with respect to the collection surface of the collection device from the width of the fingerprint, and
   the narrowing position detection device detects, as a second narrowing position as the narrowing position, a position of a divided image that has the contact width smaller than the contact width of an adjacent divided image in the longitudinal direction.

17. The computer-readable recording medium on or in which the biometric information sensing program is recorded according to claim 15, wherein the program makes the computer function such that the determination device determines, as the collection status, a pass or fail of the fingerprint image according to the length from the narrowing position to a finger tip in the fingerprint image.

18. A biometric recognition apparatus, comprising:
   a collection device that collects a fingerprint image as a biometric information image of a biometric part;
   a width detection device that detects a width of the biometric part for each of a plurality of divided images that are obtained by dividing the fingerprint image, which is collected by the collection device, in the longitudinal direction of a finger;
   a narrowing position detection device that detects a narrowing position of the biometric part in the fingerprint image on the basis of the width;
   an orientation information obtainment device that obtains ridge orientations as orientation information related to the biometric part in the fingerprint image;
   a determination device that determines a collection status of the fingerprint image on the basis of the ridge orientations near the narrowing position; and
   a biometric authentication device that performs biometric authentication using the fingerprint image that is determined by the determination device as having a collection status of pass;
   wherein the narrowing position detection device detects, as the narrowing position, a position of a divided image that has the width smaller than the width of an adjacent divided image in the longitudinal direction.

* * * * *